(12) United States Patent
Benicewicz et al.

(10) Patent No.: US 12,042,779 B2
(45) Date of Patent: Jul. 23, 2024

(54) GAS SEPARATION MEMBRANES FROM POLYMER-GRAFTED NANOPARTICLES

(71) Applicants: UNIVERSITY OF SOUTH CAROLINA, Columbia, SC (US); COLUMBIA UNIVERSITY, New York, NY (US)

(72) Inventors: Brian C. Benicewicz, Columbia, SC (US); Yucheng Huang, Charlottesville, VA (US); Connor R. Bilchak, Clifton Heights, PA (US); Sanat K. Kumar, New York, NY (US)

(73) Assignees: University of South Carolina, Columbia, SC (US); Columbia University, New York, NY (US)

( * ) Notice: Subject to any disclaimer, the term of this patent is extended or adjusted under 35 U.S.C. 154(b) by 421 days.

(21) Appl. No.: 17/617,113

(22) PCT Filed: Apr. 7, 2020

(86) PCT No.: PCT/US2020/027036
§ 371 (c)(1),
(2) Date: Dec. 7, 2021

(87) PCT Pub. No.: WO2020/247057
PCT Pub. Date: Dec. 10, 2020

(65) Prior Publication Data
US 2022/0258131 A1    Aug. 18, 2022

Related U.S. Application Data

(60) Provisional application No. 62/924,935, filed on Oct. 23, 2019, provisional application No. 62/858,457, filed on Jun. 7, 2019.

(51) Int. Cl.
*B01D 53/22* (2006.01)
*B01D 53/52* (2006.01)
(Continued)

(52) U.S. Cl.
CPC ...... *B01J 20/28038* (2013.01); *B01D 53/228* (2013.01); *B01D 63/101* (2022.08);
(Continued)

(58) Field of Classification Search
CPC ............... B01J 20/28038; B01J 20/261; B01J 20/28011; B01J 20/3085; B01J 2220/46;
(Continued)

(56) References Cited

U.S. PATENT DOCUMENTS 8,552,108 B2    10/2013  Kawakami et al.
10,112,143 B2   10/2018  Kumar et al.
(Continued)

OTHER PUBLICATIONS

PCT International Search Report Corresponding to PCT/US2020/027036 on Jun. 16, 2020.
(Continued)

*Primary Examiner* — Frank M Lawrence, Jr.
(74) *Attorney, Agent, or Firm* — DORITY & MANNING, P.A.

(57) ABSTRACT

Gas separation membranes as may be used in separating gaseous materials from one another and methods of forming the membranes are described. The separation membranes include polymer-grafted nanoparticles (GNPs) as a platform and a relatively small amount of free polymer. The free polymer and the polymer grafted to the nanoparticles have the same chemical structure and similar number average molecular weights. The gas separation membranes can exhibit high ideal selectivity and can be used in a variety of applications, such as carbon capture.

18 Claims, 11 Drawing Sheets

(51) Int. Cl.

| | | |
|---|---|---|
| B01D 53/62 | (2006.01) | |
| B01D 63/10 | (2006.01) | |
| B01D 67/00 | (2006.01) | |
| B01D 69/02 | (2006.01) | |
| B01D 69/08 | (2006.01) | |
| B01D 69/10 | (2006.01) | |
| B01D 69/14 | (2006.01) | |
| B01D 71/02 | (2006.01) | |
| B01D 71/40 | (2006.01) | |
| B01D 71/78 | (2006.01) | |
| B01J 20/26 | (2006.01) | |
| B01J 20/28 | (2006.01) | |
| B01J 20/30 | (2006.01) | |
| C08F 292/00 | (2006.01) | |

(52) U.S. Cl.
CPC ....... *B01D 67/00793* (2022.08); *B01D 69/02* (2013.01); *B01D 69/08* (2013.01); *B01D 69/10* (2013.01); *B01D 69/148* (2013.01); *B01D 71/027* (2013.01); *B01D 71/4011* (2022.08); *B01D 71/78* (2013.01); *B01J 20/261* (2013.01); *B01J 20/28011* (2013.01); *B01J 20/3085* (2013.01); *C08F 292/00* (2013.01); B01D 2053/224 (2013.01); B01D 2323/38 (2013.01); B01D 2325/04 (2013.01); B01D 2325/34 (2013.01); B01J 2220/46 (2013.01); C08F 2438/03 (2013.01)

(58) Field of Classification Search
CPC ............... B01D 53/228; B01D 63/101; B01D 67/00793; B01D 69/02; B01D 69/08; B01D 69/10; B01D 69/148; B01D 71/027; B01D 71/4011; B01D 71/78; B01D 2053/224; B01D 2323/38; B01D 2325/04; B01D 2325/34; B01D 71/401; B01D 67/0079; B01D 63/10; B01D 2256/24; B01D 2257/504; C08F 292/00; C08F 2438/03
USPC ................... 95/43, 45, 50; 96/4, 7, 8, 10–14
See application file for complete search history.

(56) References Cited

U.S. PATENT DOCUMENTS

| | | | |
|---|---|---|---|
| 2015/0343387 A1* | 12/2015 | Kim ........................ | B01D 71/34 210/500.33 |
| 2016/0101386 A1* | 4/2016 | Kumar .................... | C10L 3/103 422/86 |
| 2019/0083942 A1 | 3/2019 | Kawakami et al. | |

OTHER PUBLICATIONS

Agarwal et al., Crowded, Confined, and Frustrated: Dynamics of Molecules Tethered to Nanoparticles, Physical Review Letters, 258301, vol. 109, No. 25, Dec. 21, 2019, (Abstract Only) https://doi.org/10.1103/physreylett_109.258301.

Akcora et al., Anisotropic Self-Assembly of Spherical Polymer-Grafted Nanoparticles, Nature Materials, vol. 8, 2009, pp. 354-359. (Abstract Only) https://www.nature.com/articles/nmat2404.

Anderson et al., General Purpose Molecular Dynamics Simulations Fully Implemented on Graphics Processing Units, Journal of Computational Physics, vol. 227, Issue 10, May 1, 2008, pp. 5342-5359. (Abstract Only) https://www.sciencedirect.com/science/article/pii/S0021999108000818.

Anderson et al., Geometrical Aspects of the Frustration in the Cubic Phases of Lytropic Liquid Crystals, Proc Natl Acad Sci, vol. 85, No. 15, Aug. 1, 1988, pp. 5364-5368. https://doi.org/10.1073/pnas.85.15.5364.

Baker et al., Natural Gas Processing with Membranes: An Overview, Industrial & Engineering Chemistry Research, vol. 47, No. 7, Feb. 2008. (Abstract Only) http://dx.doi.org/10.1021/ie071083w.

Baker et al., Gas Separation Membrane Materials: A Perspective, Macromolecules, vol. 47, No. 20, 2014, pp. 6999-7013. (Abstract Only) https://pubs.acs.org/doi/abs/10.1021/ma501488s.

Bilchak et al., Polymer-Grafted Nanoparticle Membranes with Controllable Free Volume, American Chemistry Society (ACS), Macromolecules, 2017, pp. 7111-7120. https://www.benicewiczgroup.com/UserFiles/benigroup/Documents/BB146.pdf.

Borukhov, Enthalpic Stabilization of Brush-Coated Particles in a Polymer Melt, Materials Science, Macromolecules, vol. 35, No. 13, 2002, pp. 5171-5182. (Abstract Only) https://www.semanticscholar.org/paper/Enthalpic-Stabilization-of-Brush-Coated-Particles-a-Borukhov-Leibler/f3d13e5f45c3393c04b8567ece5a0671b267aaaa.

Chevigny et al., Wet-to-Dry Conformational Transition of Polymer Layers Grafted to Nanoparticles in Nanocomposite, Macromolecules, vol. 43, No. 11, 2010, pp. 4833-4837. https://doi.org/10.1021/ma100858h.

Chevigny et al., Polymer-Grafted-Nanoparticles Nanocomposites: Dispersion, Grafted Chain Conformation, and Rheological Behavior, Macromolecules, vol. 44, No. 1, 2011, pp. 122-133. (Abstract Only) https://pubs.acs.org/doi/abs/10.1021/ma101332s.

Choi et al., Toughening Fragile Matter: Mechanical Properties of Particle Solids Assembled from Polymer-Grafted Hybrid Particles Synthesized by ATRP, Soft Matter, vol. 8, 2012, pp. 4072-4082. (Abstract Only) https://pubs.rsc.org/en/content/articlelanding/2012/sm/c2sm06915f/unauth.

Chiou et al., Sorption and Transport of Gases in Miscible Poly(Methylacrylate)/Poly(Epichlorohydrin) Blends, Journal Applied Polymer Science, vol. 30, Issue 3, Mar. 1985, pp. 1173-1186. (Abstract Only) https://onlinelibrary.wiley.com/doi/abs/10.1002/app.1985.070300322.

Conley et al., Jamming and Overpacking Fuzzy Microgels: Deformation, Interpenetration, and Compression, Science Advances, vol. 3, No. 10, Oct. 20, 2017, 8 Pages. https://www.science.org/doi/10.1126/sciady.1700969.

Crank, The Mathematics of Diffusion, Second Edition, Oxford University Press, London, 69-88. http://www-eng.lbl.gov/~shuman/NEXT/MATERIALS&COMPONENTS/Xe_damage/Crank-The-Mathematics-of-Diffusion.pdf.

Daoud et al., Star Shaped Polymers: A Model for the Conformation and its Concentration Dependence, Journal de Physique, vol. 43, Issue 3, 1982, pp. 531-538. https://www.eng.uc.edu/~beaucag/Classes/Properties/Daoud%20Cotton%20Model.pdf.

Doghieri et al., Nonequilibrium Lattice Fluids: A Predictive Model for the Solubility in Glassy Polymers, Materials Science, Macromolecules, vol. 29, No. 24, Feb. 2013, (Abstract Only) http://dx.doi.org/10.1021/ma951366c.

Ferry, Viscoelastic Properties of Polymers, Third Edition, 1980, 662 Pages. Uploaded as NPL_A and NPL_B https://www.eng.uc.edu/~beaucag/Classes/Properties/Books/Viscoelastic%20Properties%20of%20Polymers%20Ferry.pdf.

Fetters, et al., Chain Dimensions and Entanglement Spacings, Physical Properties of Polymers Handbook 2e, Chapter 25, 2006, pp. 445-452. https://www.materials.uoc.gr/el/undergrad/courses/ETY450/notes/Fetters2.pdf.

Freeman, Basis of Permeability/Selectivity Tradeoff Relations in Polymeric Gas Separation Membranes, Macromolecules, vol. 32, No. 2, 1999, pp. 375-380. (Abstract Only) https://pubs.acs.org/doi/abs/10.1021/ma9814548.

Galizia et al., 50$^{th}$ Anniversary Perspective: Polymers and Mixed Matrix Membranes for Gas and Vapor Separation: A Review and Prospective Opportunities, Macromolecules, vol. 50, 2017, pp. 7809-7843. https://pubs.acs.org/doi/pdf/10.1021/acs.macromol.7b01718.

Garnweitner et al., Large-Scale Synthesis of Organophilic Zirconia Nanoparticles and their Application in Organic-Inorganic Nanocomposites for Efficient Volume Holography, Nano-Micro Small, vol. 3, Issue 9, Sep. 3, 2007, pp. 1626-1632. (Abstract Only) https://onlinelibrary.wiley.com/doi/abs/10.1002/smll.200700075.

Glaser et al., Strong Scaling of General-Purpose Molecular Dynamics Simulations on GPUs, Computer Physics Communications, vol.

(56) References Cited

OTHER PUBLICATIONS

192, Jul. 2015, pp. 97-107. (Abstract Only) https://www.sciencedirect.com/science/article/abs/pii/S0010465515000867.
Grest et al., Molecular Dynamics Simulation for Polymers in the Presence of a Heat Bath, Physical Review A, vol. 33, Issue 5, May 1986, p. 3628. (Abstract Only) https://journals.aps.org/pra/abstract/10.1103/PhysReyA.33.3628.
Honerkamp et al., A Nonlinear Regularization Method for the Calculation of Relaxation Spectra, Rheologica Acta, vol. 32, 1993, pp. 65-73. (Abstract Only) https://link.springer.com/article/10.1007/BF00396678.
Howard et al., Efficient Neighbor List Calculation for Molecular Simulation of Colloidal Systems Using Graphics Processing Units, Computer Physics Communications, vol. 203, Jun. 2016, pp. 45-52. (Abstract Only) https://www.sciencedirect.com/science/article/abs/pii/S0010465516300182.
Jimenez-Solomon et al., Polymer Nanofilms with Enhanced Microporosity by Interfacial Polymerization, Nature Materials, vol. 15, 2016, pp. 760-767. (Abstract Only) https://www.nature.com/articles/nmat4638.
Johannsmann, Viscoelastic, Mechanical, and Dielectric Measurements on Complex Samples with the Quartz Crystal Microbalance, Physical Chemistry Chemical Physics (PCCP), vol. 10, No. 31, Aug. 2008, pp. 4516-4534. (Abstract Only) https://pubmed.ncbi.nim.nih.gov/18665301/.
Kremer et al., Dynamics of Entangled Linear Polymer Melts: A Molecular-Dynamics Simulation, Journal of Chemical Physics, vol. 92, 1990, pp. 5057-5086. (Abstract Only) https://aip.scitation.org/doi/pdf/10.1063/1.458541.
Kohlbrecher, SASfit: A Program for Fitting Simple Structural Models to Small Angle Scattering Data, Paul Scherrer Institute, Laboratory for Neutron Scattering (LNS), CH-5232, https://www.researchgate.net/profile/Rogier-Besselink/post/How_can_I_calculate_Surface_per_Volume_ratio_from_SAXS/attachment/59d63112c491478072ea0d1c/AS%3A273621916815370%401442247957044/download%5BXB6%5D+sasfit.pdf.
Koros et al., Materials for Next-Generation Molecularly Selective Synthetic Membranes, Nature Materials, vol. 16, 2017, pp. 289-297. (Abstract Only) https://www.nature.com/articles/nmat4805.
Kumar et al., Nanocomposites with Polymer Grafted Nanoparticles, Macromolecules, vol. 46, 2013, pp. 3199-3214. https://www.eng.uc.edu/~beaucag/Classes/Properties/Polymer%20Physics%20Quizzes%202022/HW%2014%20Polymer%20Physics%202022/SanatKumarPhaseDiagram_ma4001385.pdf.
Li et al., A Versatile Method to Prepare RAFT Agent Anchored Substrates and the Preparation of PMMA Grafted Nanoparticles, Macromolecules, vol. 39, No. 9, 2006, pp. 3175-3183. https://www.benicewiczgroup.com/UserFiles/benigroup/Documents/BB45.pdf.
Lin et al., Materials Selection Guidelines for Membranes that Remove CO2 From Gas Fixtures, Journal of Molecular Structure, vol. 739, Issues 1-3, Apr. 2005, pp. 57-74. (Abstract Only) https://www.sciencedirect.com/science/article/abs/pii/S0022286004007331.
Maillard et al., Mechanical Properties of Thin Glassy Polymer Films Filled with Spherical Polymer-Grafted Nanoparticles, Nano Letters, vol. 12, No. 8, Aug. 2012, pp. 3909-3914. (Abstract Only) https://pubmed.ncbi.nlm.nih.gov/22817546/.
Martyna et al., Constant Pressure Molecular Dynamics Algorithms, Journal Chemical Physics, vol. 101, No. 5, 1994, pp. 4177-4189. https://www.academia.edu/download/34072042/JChemPhys_101_4177.pdf.
Martyna et al., Explicit Reversible Integrators for Extended Systems Dynamics, Molecular Physics, An International Journal at the Interface Between Chemistry and Physics, vol. 87, Issue 5, 1996, 1117-1157. https://aiichironakano.github.io/phys516/Martyna-Integrator-MolPhys96.pdf https://doi.org/10.1080/00268979600100761.
Merkel et al., Ultrapermeable, Reverse-Selective Nanocomposite Membranes, Science, vol. 296, Issue 5567, 2002, pp. 519-522. (Abstract Only) https://doi.org/10.1126/science.1069580.
Murali et al., Air Separation by Polymer-Based Membrane Technology, Separation & Purification Reviews, vol. 42, Issue 2, 2013, pp. 130-186. (Abstract Only) https://doi.org/10.1080/15422119.2012.686000.
Ohno et al., Suspensions of Silica Particles Grafted with Concentrated Polymer Brush: A New Family of Colloidal Crystals, Materials Science, Macromolecules, vol. 39, No. 3, Feb. 2006, pp. 1245-1249. (Abstract Only) https://pubs.acs.org/doi/10.1021/ma0521708.
Ohno et al., Suspensions of Silica Particles Grafted with Concentrated Polymer Brush: Effects of Graft Chain Length on Brush Layer Thickness and Colloidal Crystallization, Macromolecules, vol. 40, No. 25, 2007, pp. 9143-9150. (Abstract Only) https://pubs.acs.org/doi/pdf/10.1021/ma071770z.
Pakula, Static and Dynamic Properties of Computer Simulated Melts of Multiarm Polymer Stars, Computational and Theoretical Polymer Science, vol. 8, Issues 1-2, 1998, pp. 21-30. (Abstract Only) https://www.sciencedirect.com/science/article/abs/pii/S1089315698000038.
Park et al., Maximizing the Right Stuff: The Trade-Off Between Membrane Permeability and Selectivity, Science, vol. 356, Issue 6343, Jun. 2017, 12 Pages. https://www.fkit.unizg.hr/_download/repository/elimelech_review_on_membranes.pdf https://www.science.org/doi/abs/10.1126/science.aab0530.
Park et al., Polymers with Cavities Tuned for Fast Selective Transport of Small Molecules and Ions, Science, vol. 318, No. 5848, 2007, pp. 254-258. https://www.academia.edu/download/78159768/Polymers_with_Cavities_Tuned_for_Fast_Se20220105-17241-1g25vm7.pdf https://www.science.org/doi/abs/10.1126/science.1146744.
Percus et al., Analysis of Classical Statistical Mechanics by Means of Collective Coordinates, Physical Review Journals Archive, vol. 110, Issue 1, Apr. 1958, pp. 1-13. (Abstract Only) https://journals.aps.org/pr/abstract/10.1103/PhysRev.110.1.
Priestley et al., Structural Relaxation of Polymer Glasses at Surfaces, Interfaces, and In Between, Science, vol. 309, No. 5733, 2005, pp. 456-459. (Abstract Only) https://www.science.org/doi/10.1126/science.1112217.
Robeson, Correlation of Separation Factor Versus Permeability for Polymeric Membranes, Journal of Membrane Science, vol. 62, Issue 2, 1991, pp. 165-185. (Abstract Only) https://www.sciencedirect.com/science/article/abs/pii/037673889180060J.
Robeson, The Upper Bound Revisited, Journal of Membrane Science, vol. 320, Issues 1-2, 2008, pp. 390-400. https://doi.org/10.1016/j.memsci.2008.04.030 http://dns2.asia.edu.tw/~ysho/YSHO-English/2000%20CE/PDF/J%20Mem%20Sci320,%20390.pdf.
Sanders et al., Energy-Efficient Polymeric Gas Separation Membranes for a Sustainable Future: A Review, Polymer, vol. 54, Issue 18, 2013, pp. 4729-4761. https://www.sciencedirect.com/science/article/pii/S0032386113005399.
Takahashi et al., Gas Permeation in Poly(Ether Imide) Nanocomposite Membranes Based on Surface-Treated Silica. Part 1: Without Chemical Coupling to Matrix, Polymer, vol. 47, Issue 21, 2006, pp. 7519-7534. (Abstract Only) https://www.sciencedirect.com/science/article/abs/pii/S0032386106009815.
Tanaka et al., Ordered Structure in Mixtures of a Block Copolymer and Homopolymers, 1. Stabilization of Low Molecular Weight Homopolymers, Macromolecules, vol. 24, 1991, pp. 240-251. (Abstract Only) https://pubs.acs.org/doi/10.1021/ma00001a037.
Valassopoulos et al., Turnable Rheology of Dense Soft Deformable Colloids, Current Opinion in Colloid & Interface Science, vol. 19, Issue 6, Dec. 2014, pp. 561-574. (Abstract Only) https://www.sciencedirect.com/science/article/abs/pii/S1359029414000946.
Weese, A Regularization Method for Nonlinear Ill-Posed Problems, Computer Physics Communications, vol. 77, Issue 3, Nov. 1993, pp. 429-440. (Abstract Only) https://www.sciencedirect.com/science/article/abs/pii/001046559390187H.
Yampolskii, Polymeric Gas Separation Membranes, Macromolecules, vol. 45, No. 8, 2012, pp. 3298-3311. (Abstract Only) https://pubs.acs.org/doi/abs/10.1021/ma300213b.

* cited by examiner

GAS SEPARATION MEMBRANES FROM POLYMER-GRAFTED NANOPARTICLES

CROSS REFERENCE TO RELATED APPLICATION

This application is the US national stage entry of International Application No. PCT/US2020/027036, having a filing date of Apr. 7, 2020, entitled "Gas Separation Membranes from Polymer-Grafted Nanoparticles," which claims filing benefit of U.S. Provisional Patent Application Ser. No. 62/858,457, having a filing date of Jun. 7, 2019, entitled "Gas Separation Constructs from Polymer-Grafted Nanoparticles," and of U.S. Provisional Patent Application Ser. No. 62/924,935, having a filing date of Oct. 23, 2019, entitled, "Gas Separation Membranes from Polymer-Grafted Nanoparticles," all of which are incorporated herein by reference in their entirety.

FEDERAL RESEARCH STATEMENT

This invention was made with Government support under Grant No. CBET1629052, awarded by the National Science Foundation. The Government has certain rights in the invention.

BACKGROUND

Polymeric membranes are critical to many sustainability applications that separate gas mixtures based on differences in size of the molecules contained in the mixture. For instance, glassy polymeric membranes are routinely used to separate gas mixtures, e.g., shale gas remediation and carbon capture. Membrane separations are cost efficient relative to competing technologies but are limited by the tradeoff between gas permeability and selectivity. Permeability ($P_i$) is proportional to throughput and $P_i = D_i \times S_i$, in which $D_i$ is the gas diffusivity and $S_i$ its solubility coefficient. The ideal selectivity, $\alpha_{ij} = P_i/P_j$, is an excellent proxy for product purity. While new polymer classes, e.g., thermally rearranged (TR) polymers and polymers of intrinsic microporosity (PIMs), have been found to improve performance, the ability to design materials with enhanced separation and mechanical properties (e.g., strength, aging behavior) remains a challenge.

One approach that has been examined to improve separation membrane technology is to incorporate nanoparticles into the polymer to form "mixed matrix" membranes. Unfortunately, while physical mixtures of nanoparticles with polymer matrices sometimes improve overall gas transport, they most often result in worse separations due to nanoparticle aggregation caused by the immiscibility between inorganic polar nanoparticles and non-polar polymers of the matrix. The addition of the nanoparticles does, however, improve mechanical properties and aging behavior, which are highly desirable traits.

In an attempt to solve the miscibility problem and ensure good nanoparticle dispersion, the polymers that form the matrix have been chemically grafted to the nanoparticles surfaces to create grafted nanoparticles (GNPs). Films formed of GNPs have been fashioned as thin as 150 nm, which are flexible and easily processable with the presence of the nanoparticles' increasing mechanical strength of the films. However, matrices of pure GNPs generally exhibit enhanced permeability relative to those of the neat polymer, and this enhanced permeability is often accompanied by decrease in ideal selectivity.

What is needed in the art are separation membranes that can selectively affect the transport of different components of a gaseous mixture for separation technologies while maintaining/exhibiting other desirable characteristics, e.g., desirable mechanical characteristics.

SUMMARY

According to one embodiment disclosed is a gas separation membrane that includes polymer grafted nanoparticles (GNP), which include a core particle and a polymer grafted to a surface of the core particle. The polymer of the GNP can have a known number average molecular weight ($M_n$) and a narrow polydispersity index (PDI), e.g., about 2 or less. The gas separation membrane can also include free polymer distributed throughout the GNP in an amount of about 10% or less by weight of the GNP. The free polymer can have the same chemical structure as the polymer of the GNP. In addition, the free polymer can have a $M_n$ that is about the same as that of the polymer of the GNP. For instance, the $M_n$ of the free polymer can differ from that of the GNP polymer by about 20% or less of the $M_n$ of the GNP polymer. In addition, the free polymer can have a narrow PDI, e.g., about 2 or less. In some embodiments, the membrane can be self-supporting. In other embodiments, the membrane can be supported on a porous substrate.

A method of forming a gas separation membrane is also described. For instance, a method can include grafting a polymer on a core particle to form a GNP and combining a plurality of the GNP with a free polymer to form a mixture. The mixture can include the free polymer in an amount of about 10% or less by weight of the GNP. The method can also include processing the mixture, e.g., via solution casting, melt processing, etc., to form a membrane.

Also disclosed is a method for separating a mixture of gases. The method can include contacting the mixture of gases with a gas separation membrane as described. Upon the contact, a first gaseous component of the mixture can preferentially permeate the membrane as compared to a second gaseous component of the mixture. For instance, the membrane can exhibit an ideal selectivity for the first component of about 2 or greater.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
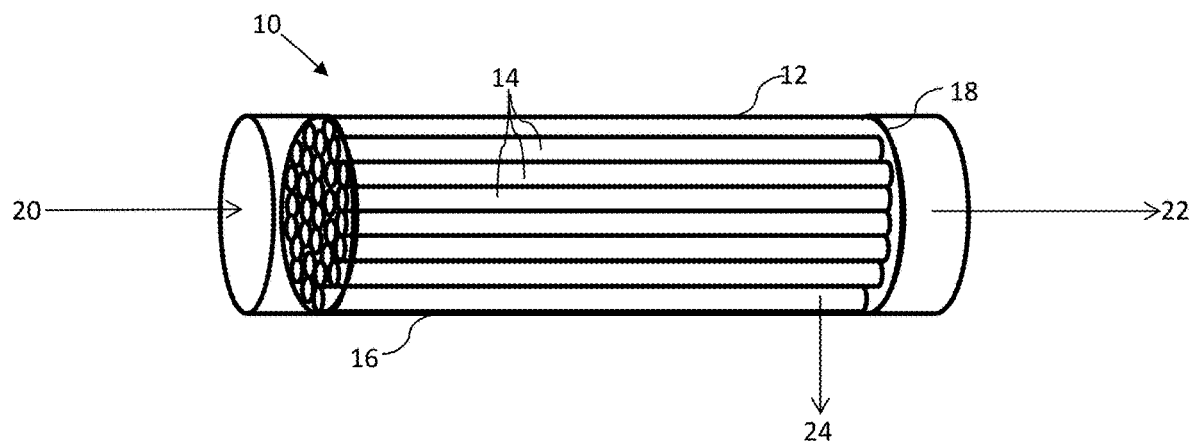
FIG. 1 presents a schematic illustrates of a hollow fiber membrane separation device as may incorporate a separation membrane as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to membranes as may be used in separating gaseous materials from one another and methods of forming the membranes. The separation membranes include polymer-grafted nanoparticles (GNPs) as a platform and can exhibit excellent gas separation and mechanical performance. The separation membranes improve on previous technology by inclusion of both GNPs and free polymer in a particular and advantageous fashion. Previous membranes formed with GNPs can show improved strength characteristics but can also show upwards of an order of magnitude increase in gas permeability and proportional decrease in selectivity relative to the pure polymers, which is believed to be due to a compromise between the grafted chains filling space and the reduced ability of adjacent brushes to interpenetrate one another. Specifically, it is presently understood that during formation of a membrane of GNPs, the GNPs self-assemble into a jammed state with increased polymer molar volume which leads to higher permeability and lower selectivity.

In the disclosed separation membranes, free polymer chains are incorporated into the membrane in conjunction with the GNPs. The inclusion of the free polymer chains is believed to mediate the higher permeability effect of the GNPs. Surprisingly, however, it has been discovered that the characteristics of the free polymer chains and the addition level of the free polymer chains have an effect on the separation characteristics of the membranes. For instance, addition of relatively short polymer chains leads to the presence of the free polymer throughout the composite and, as such, reduces the permeability of all gases. Addition of relatively long polymer chains, on the other hand, leads to segregation of the free polymer into interstices between the nanoparticles and the hindrance of large solute motion. The presently disclosed separation membranes have been developed through study and manipulation of the physics of such composite membranes, leading to the surprising discovery of novel, apparently generic means of dramatically improving membrane performance and strength characteristics, even when considering formation of separation membranes with ubiquitous polymers.

Disclosed separation membranes have been formed by adding small quantities of polymer chains to the membrane that are not grafted to core particles of the GNP. Throughout this disclosure, these added polymer chains are referred to as "free polymer" or "free polymer chains." The free polymer chains added to the membrane have the same chemistry as the polymers of the GNPs. In addition to having a particular chemistry, the free polymer chains of the membranes also have a particular chain length. Addition of relatively short, ungrafted chains, which would be expected to mix homogeneously throughout the grafted polymer, will reduce the excess volume caused by GNP self-assembly. However, this can also reduce permeability of all gases without improving selectivity of the membrane. On the other hand, free polymers having relatively long chains, e.g., chains longer than those of the grafts, will be less miscible with the GNPs and will segregate to the outer regions of the brush, yielding lower permeability without improving selectivity. Unexpectedly, it has been found that for intermediate free polymer chain lengths, i.e., chain length comparable in length to that of the graft polymer (e.g., differing by about 20% or less in $M_n$ from the grafted polymers), only the transport of larger solutes is strongly and selectively hindered, while the permeability of smaller solutes is affected much less. This results in remarkable selectivity increases, yielding membrane performance that is better than even the best performing current materials such as those based on TR polymers. Moreover, the high selectivity capabilities of disclosed membranes can be achieved even with membranes formed of common polymers, e.g., poly(methacrylate) (PMA) and poly(methyl methacrylate (PMMA), which historically have been considered sub-optimal separation membrane materials.

Without wishing to be bound to any particular theory, it is believed that short chains added to a GNP-based membrane act akin to a solvent, plasticizing the GNPs and reducing packing frustration in the concentrated polymer brush regime, thereby reducing the permeability of all gases. In contrast, longer chains do not penetrate the brush, reside in the interstices between the nanoparticles, and result in a depletion attraction between the nanoparticles which leads to a large-scale interstitial structure formation. While these interstitial structures hinder the motion of larger solutes, the resulting depletion attraction between nanoparticles also reduces the polymer volume, slowing down the smaller solutes. In the disclosed membranes, the relative importance of these effects can be controlled by selection of the length of the free polymer chains, with beneficial effects occurring when the free polymer chains are comparable in length to the polymer of the GNPs and when the free polymer is added in a relatively low amount as compared to the GNP content of the membrane. While most research to date has shown that separations based on size differences is common in polymeric membranes, the presently disclosed membranes provide a facile means to selectively control the transport of different components of a gas mixture through the addition of free polymer to a GNP-based membrane.

The separation membranes can incorporate any of a variety of different types of nanoparticles for the core of the GNP component. Nanoparticles can encompass, for example, natural or synthetic nanoclays (including those made from amorphous or structured clays), inorganic metal oxides (e.g., silica, alumina, and the like), nanolatexes, organic nanoparticles, etc. In one embodiment, the GNPs can incorporate inorganic nanoparticles, such as silica, alumina, titania ($TiO_2$), indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof. The nanoparticles may be crystalline or amorphous. A single type of nanoparticle may be used, or mixtures of different types of nanoparticles may be used.

As utilized herein, the term "nanoparticles" refers to particles of any shape (including, but not limited to, rod-shaped particles including solid rods and hollow tubes, disc-shaped particles, platelet-shaped particles, tetrahedral-shaped particles, and particles of an indeterminate, amorphous shape) having at least one dimension on the nano scale. In one embodiment, the nanoparticles can have at least one dimension having an average size of from about 1 nm to about 1000 nm, for instance from about 1 nm to about 500 nm, from about 2 nm to about 300 nm, or from about 3 nm to about 100 nm in some embodiments. In one embodiment, the nanoparticles can be formed by exfoliation from a larger starting material to form the nanoparticle. Such starting material may have an average size of up to about 50 microns (50,000 nanometers). In another embodiment, the nanoparticles can be grown to the desired average particle size.

The separation membranes also include polymers that are present both as grafted polymers on the surface of the nanoparticles and as free polymers. The membranes include graft and free polymers having the same chemistry and being roughly the same size. The types of polymers that can be utilized in forming disclosed membranes are not particularly limited. For instance, polymers can include polyacrylates, poly(methacrylates), poly(alkyl methacrylates), poly (acrylamides), polystyrenes, polyanilines, polyimides, polyesters, polyamides, as well as copolymers thereof. By way of example, the polymers can include poly (alkyl methacrylates) formed by polymerization of monomers including, but not limited to, methacrylate with side chains (e.g., having a chain length of 1 to 18 carbons). For example, the polymers can include poly (methyl methacrylate), poly (butyl methacrylate), poly (hexyl methacrylate), poly (lauryl methacrylate), poly (stearyl methacrylate), etc. In one embodiment, the polymers of the separation membrane can encompass copolymers, such as poly (alkyl methacrylate) copolymers with ethylene, vinyl acetate, etc., as are known.

The polymer of the GNP and the free polymer of the membranes can have a similar number average molecular weight ($M_n$). For instance, the $M_n$ of the free polymer can differ from the $M_n$ of the grafted polymer by about 20% or less, about 10% or less, about 5% or less, or about 2% or less in some embodiments. The $M_n$ of the free and grafted polymers can vary. For instance, the $M_n$ of the free polymer and the grafted polymer can be from about 50 kDa to about 500 kDa; for instance, from about 50 kDa to about 300 kDa, or about 100 kDa in some embodiments.

As utilized herein, the "number average molecular weight" ($M_n$) generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

in which $N_i$ is the number of molecules of molecular weight $M_i$. The number average molecular weight of a polymer can be determined by gel permeation chromatography, as well as colligative methods, such as vapor pressure osmometry or end-group determination as are known in the art.

In some embodiments, the polydispersity index (PDI) of the free polymer and the grafted polymer can be relatively small, such as about 2 or less, or from about 1.1 to about 2.0. As utilized herein, the PDI is a measure of the distribution of molecular mass in a given polymer sample. It indicates the distribution of individual molecular masses in a batch of polymers. The PDI has a value equal to or greater than 1, and as the polymer chains of a given sample approach uniform chain length, the PDI approaches 1. The PDI of a polymer can be determined as the weight average molecular weight divided by the number average molecular weight.

As utilized herein, the "weight average molecular weight" (Mw) can be represented by the formula:

$$\overline{M}_\omega = \frac{\sum_i N_i M_i^2}{\sum_i N_i M_i}$$

in which $N_i$ and $M_i$ are as defined above. The weight average molecular weight can be determined by light scattering, small angle neutron scattering (SANS), X-ray scattering, gel permeation chromatography, and sedimentation velocity as are known in the art.

The GNP of the separation membrane can be formed by grafting a polymer of the selected chemistry and size to the nanoparticle core. The polymer of the GNP can be grafted to the nanoparticle core according to either a "grafting-from" approach or a "grafting-to" approach. A "grafting from" approach is carried out by polymerizing a plurality of monomers onto the nanoparticle by use of a functionality present on a surface of the nanoparticle and subsequent growth of the polymer chain. A "grafting-to" approach involves covalently bonding of a previously formed polymer chain to the nanoparticle surface via a functionality present on a surface of the nanoparticle. In this embodiment, the grafted polymeric chain is not limited to the type of polymerization and/or types of monomer(s) capable of being polymerized directly to the nanoparticle surface. As such, as long as the polymeric chain defines a functional group that can react and bond to the nanoparticle surface, any polymeric chain can be bonded to the nanoparticle. Whether utilizing a grafting-to method or a grafting-from method, functionality used to bond polymers to the nanoparticle surface can be naturally present or can be an added component on the surface of the particle. For instance, a nanoparticle can be processed to include an anchoring compound attached to the nanoparticle surface. Upon polymerization of monomers at the nanoparticle surface in a grafting from approach, a polymeric chain can be formed that is covalently bonded to the nanoparticle surface.

The free polymer of the separation membrane can be formed according to the same or different process as the grafted polymer of the GNP. For instance, the GNP can be formed according to a surface-initiated controlled polymerization technique and the free polymer can be formed according to the same basic, controlled polymerization technique but formed in solution rather than via a surface-initiated polymerization. Alternatively, the free polymer can also be formed according to the same surface-initiated controlled polymerization technique as the GNP and then disassociated from the formation surface following polymerization. In yet another alternative, the free polymer can be formed according to a different polymerization technique as the GNP. The particular polymerization technique for the GNP and the free polymer can generally be selected based upon the desired polymeric chain to be formed and, in some embodiments, also based upon the size of the polymers to be formed.

In general, the polymeric chains of both the free polymer and the GNP can be formed via controlled polymerizations, such as controlled living polymerizations (CLPs) or controlled ring-opening polymerizations, which may be independently selected as discussed above. Through the use of these controlled polymerizations, the polymer chains can be produced with desired molecular weights, low polydispersity, and diverse architectures.

Controlled living polymerization generally refers to chain growth polymerization which proceeds with significantly suppressed termination or chain transfer steps. Thus, polymerization in CLP proceeds until all monomer units have been consumed or until the reaction is terminated (e.g., through quenching and/or deactivating), and the addition of monomer results in continued polymerization, making CLP attractive for block polymer and graft polymer synthesis. The molecular weight of the resulting polymer is generally a linear function of conversion so that the polymeric chains are initiated and grow substantially uniformly. Accordingly, CLP can provide precise control on molecular structures, functionality and compositions, and polymers formed by CLP, and can be finely tuned with regard to chemistry and molecular weight, which can be desirable for disclosed membranes.

CLP processes maintain a functional group on the polymer terminus (e.g., a halogen functional group) during the polymerization process. As such, CLP is often used in formation of block copolymers. For example, in the copolymerization of two monomers (A and B) allowing A to polymerize via CLP can exhaust the monomer in solution with minimal termination. After monomer A is fully reacted, the addition of monomer B can instigate further polymerization and result in formation of a block copolymer.

A brief general description of several polymerization techniques as may be utilized in forming one or both of the free polymer and the GNP is provided herein for further understanding of the present invention and is not intended to be limiting.

In one embodiment, the graft polymer and/or the free polymer can be formed according to a Reversible Addition-Fragmentation Chain Transfer (RAFT) polymerization technique. For example, polymerization of monomers containing a vinyl functionality, e.g., acrylate, methacrylate groups, acrylamides, styrenics, etc., can be particularly suitable for RAFT polymerization.

RAFT polymerization uses thiocarbonylthio compounds, such as dithioesters, dithiocarbamates, trithiocarbonates, and xanthates, to mediate polymerization via a reversible chain-transfer process. RAFT polymerization can be performed by simply adding a chosen quantity of an appropriate RAFT agent (e.g., thiocarbonylthio compounds) to a conventional free radical polymerization. Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can include, for example, azobisisobutyronitrile (AIBN), 4,4'-azobis(4-cyanovaleric acid) (ACVA), etc.

In one embodiment, a RAFT can be a thiocarbonylthio compound as generally shown below:

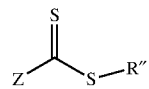

in which the z group stabilizes radical species added to the C=S bond, and the R" group is a good homolytic leaving group that is able to initiate monomers. For example, the z group can be an aryl group (e.g. phenyl group, benzyl group, etc.), an alkyl group, etc. The R" group can be an organic chain terminating with a carboxylic acid group.

As with other living radical polymerizations, there is a minimized termination step in a RAFT process. The reaction is begun by use of radical initiators (e.g., AIBN) during which the initiator reacts with a monomer to create a radical species that begins the active polymerizing chain. The active chain then reacts with the thiocarbonylthio compound, causing release of the homolytic leaving group (R"). This is a reversible step, with an intermediate species capable of losing either the leaving group (R") or the active species. The leaving group radical then reacts with another monomer species, continuing the polymer chain. The active chain is able to go through either the addition-fragmentation step or the equilibration step. The active polymer chains are in equilibrium between the active and dormant species, with the majority of the propagating species in the dormant thiocarbonyl form, limiting the possibility of chain termination. By controlling the concentration of initiator and thiocarbonylthio compound and/or the ratio of monomer to thiocarbonylthio compound, the molecular weight of the polymeric chains can be controlled to form polymers with low polydispersities.

Depending on the target molecular weight of final polymers, the monomer to RAFT agent ratios can range from about less than about 10 to more than about 1000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc., as well as mixtures of solvents. The reaction temperature can range from room temperature (e.g., about 20° C.) to about 120° C. The reaction time can be from less than about 1 hour to about 48 hours.

The RAFT process can be selected in one embodiment as it allows synthesis of polymers with specific macromolecular architectures, such as block, gradient, statistical, comb/brush, star, hyperbranched, and network copolymers. For instance, by using a multifunctional RAFT agent, a star copolymer can be formed. RAFT differs from other forms of CLPs because the core of the copolymer can be introduced by functionalization of either the R group or the Z group of the above structure. Use of the R group results in similar structures found using other polymerization methods, such as ATRP or NMP, while the use of the Z group makes RAFT unique. When the Z group is used, the reactive polymeric arms can be detached from the core while they grow and then they can react back into the core for the chain-transfer reaction.

In one embodiment, one or both of the free polymer and the GNP can be formed according to an Atom Transfer Radical Polymerization (ATRP) process. In this embodiment, polymerization control can be achieved through an activation-deactivation process, in which most of the reaction species are in dormant format, thus significantly reducing chain termination reaction. The four major components of ATRP include the monomer, initiator, ligand, and catalyst. ATRP is often used when polymerizing monomers having a vinyl functional group (e.g., a methacrylate group).

Organic halides are suitable initiators for ATRP, such as alkyl halides (e.g., alkyl bromides, alkyl chlorides, etc.). For instance, an initiator can be ethyl 2-bromoisobutyrate. The shape or structure of the initiator can also determine the architecture of the resulting polymer. For example, initiators with multiple alkyl halide groups on a single core can lead to a star-like polymer shape.

The catalyst for an ATRP approach can generally determine the equilibrium constant between the active and dormant species during polymerization, leading to control of the polymerization rate and the equilibrium constant. In one particular embodiment, the catalyst can be a metal having two accessible oxidation states that are separated by one electron and a reasonable affinity for halogens. One particularly suitable metal catalyst for ATRP is copper (I).

The ligand component of an ATRP can include linear amines or pyridine-based amines.

Depending on the target molecular weight of the polymer to be formed, the monomer to initiator ratios in ATRP can range from less than about 10 to more than about 1,000 (e.g., about 10 to about 1,000). Other reaction parameters can be varied to control the molecular weight of the final polymers, such as solvent selection, reaction temperature, and reaction time. For instance, solvents can include conventional organic solvents, such as tetrahydrofuran, toluene, dimethylformamide, anisole, acetonitrile, dichloromethane, etc., or mixtures of solvents. The reaction temperature can range from room temperature (e.g., about 20° C.) to about 120° C. The reaction time can be from less than about 1 hour to about 48 hours.

In one embodiment, one or both of the free polymer and the GNP can be formed according to a Nitroxide-Mediated Polymerization (NMP) process. NMP utilizes a nitroxide radical in the polymerization, i.e.:

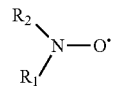

in which $R_1$ and $R_2$ are, independently organic groups (e.g., aryl groups such as phenyl groups, benzyl groups, etc.; alkyl groups, etc.). NMP is often utilized in polymerizing monomers having a vinyl functional group (e.g., a methacrylate group).

Ring-opening metathesis polymerization (ROMP) is a type of olefin metathesis polymerization in which the driving force of the reaction is relief of ring strain in cyclic olefins (e.g., norbornene or cyclopentene). The catalysts used in a ROMP reaction can include a wide variety of metals and range from a simple $RuCl_3$/alcohol mixture to Grubbs' catalyst. In ROMP, the monomer can include a strained ring functional group, such as a norbornene functional group, a cyclopentene functional group, etc., to form the polymeric chains. For example, norbornene is a bridged cyclic hydrocarbon that has a cyclohexene ring bridged with a methylene group in the para position.

In a ROMP process, formation of a metal-carbene species is followed by attack of the double bond in the ring structure by the carbene, forming a highly strained metallacyclobutane intermediate. The ring then opens, giving the beginning of the polymer: a linear chain double-bonded to the metal with a terminal double bond as well. The new carbene reacts with the double bond on the next monomer, thus propagating the reaction.

On formation of the GNP, the grafted polymer can be attached to the nanoparticle core at a graft density that is generally from about 0.01 chains/square nanometer surface area (ch/nm$^2$) to about 3 ch/nm$^2$; for instance, from about 0.1 ch/nm$^2$ to about 1 ch/nm$^2$, from about 1 ch/nm$^2$ to about 2 ch/nm², or about 0.5 ch/nm² in some embodiments. The grafting density (σ) can be calculated in one embodiment from the corresponding weight loss ratio determined by thermal gravimetric analysis (TGA) using the following relationship:

$$\sigma = \frac{\left(\frac{W_{polymer}}{100 - W_{polymer}}\right) \times \rho \times V_{particle} \times N_A}{M_N \times S_{particle}}$$

in which
- $W_{polymer}$ is the percent weight loss corresponding to polymer decomposition;
- $\rho$ is the density of the core particle (e.g. 2.07 g/cm³ for silica);
- $V_{particle}$ is the volume of the GNP;
- $N_A$ is Avogadro's number;
- $M_n$ is number average molecular weight of the polymer; and
- $S_{particle}$ is the surface area of the GNP Grafting density can also be determined by UV-Vis spectroscopy methods according to known protocols.

To form a separation membrane, the GNP can be combined with free polymer to form a composite mixture, and the mixture can then be processed to form a membrane having the desired size. The amount of the free polymer can be relatively small compared to the amount of the GNP of the membrane. For instance, the mixture can include about 10% by weight or less of the free polymer by weight of the GNP, such as about 5 wt. % or less, or about 2 wt. % or less in some embodiments, such as from about 1 wt. % to about 10 wt. %.

The mixture can then be processed to form a membrane according to, e.g., solution casting methods as are known in the art. For instance, a solution including the GNP and the polymer in a suitable solvent, e.g., tetrahydrofuran (THF) or the like, can be cast on a support followed by removal of the solvent at ambient or increased temperature conditions. In some embodiments, the membrane can be annealed, e.g., at a temperature of about 100° C. or less; for instance, from about 50° C. to about 100° C., or about 80° C.

Membranes can be formed to a thickness to provide desired stability and strength without destruction of desired separation capability of the membrane. For example, a membrane can have a thickness of about 0.05 μm or greater. The preferred membrane thickness can, in some embodiments, depend upon the application of the membrane. For instance, in some embodiments, a membrane can be formed to be self-supporting, in which case a membrane can have a relatively large thickness. For instance, a self-supporting separation membrane can have a thickness of about 0.5 micrometers (μm) or greater, such as from about 1 μm to about 500 μm, from about 5 μm to about 300 μm, or from about 50 μm to about 200 μm in some embodiments. In some embodiments, a membrane can be formed to be supported by a substrate, in which case the thickness of the membrane can be quite small, for instance as thin as about 0.05 μm (50 nm) or greater or about 0.1 μm or greater in some embodiments.

In those embodiments in which a membrane will be utilized as a supported membrane, the membrane can be formed directly on the supporting substrate or can be applied to a supporting substrate following formation. In general, a supporting substrate can have a relatively large porosity, many times that of the separation membrane itself, so as to avoid impeding the separation characteristics of the membrane. For instance, a supporting substrate can typically have a porosity in the range of from about 0.01 to about 1; for instance, from about 0.05 to about 0.8, or from about 0.1 to about 0.6. Porosity, as utilized herein, refers to the ratio of non-solid volume to the total volume (i.e., non-solid and solid) of a structure.

Supporting substrate materials can encompass any material as is generally known in the art. For instance, a woven or nonwoven fibrous textile, generally formed of a polymeric composition and, optionally, pretreated to exhibit desired porosity can be utilized as a supporting membrane. Examples of polymers as may be utilized in a woven or nonwoven supporting substrate can include, without limitation, polyesters, polyamides, polyolefins, or a mixture or a copolymer thereof, with preferred materials generally depending upon the expected use of the separation membrane.

Other materials as may be utilized in forming a supporting substrate can include, without limitation, porous metal substrates. A suitable metal material can be selected from any of the materials known to those skilled in the art including, but not limited to, the stainless steels, e.g., the 301, 304, 305, 316, 317, and 321 series of stainless steels; the HASTELLOY© alloys, e.g., HASTELLOY® B-2, C-4, C-22, C-276, G-30, X and others; and the INCONEL® alloys, e.g., INCONEL® alloy 600, 625, 690, and 718. The supporting substrate material can comprise an alloy that can include iron and chromium or other alloy metals, such as nickel, manganese, molybdenum, or any combination thereof.

The supporting substrate may be of any shape or geometry provided that it has a surface that permits the separation membrane to be applied or deposited thereon. Such shapes can include planar or curvilinear sheets of the porous material having an undersurface, and a top surface that together define a support thickness. In one embodiment, the shape of the supporting substrate can be tubular, such as, for example, rectangular, square, and circular tubular shapes that have an inside surface and an outside surface that together define a wall thickness, with the inside surface of the tubular shape defining a tubular conduit.

The formed separation membrane can include a relatively large quantity of the GNP in some embodiments. For instance, the separation membrane can include about 85 wt. % or more, about 90 wt. % or more, about 95 wt. % or more, or about 98 wt. % or more of the GNP component. In some embodiments, the separation membrane can include only the GNP and the free polymer, but this is not a requirement of the membranes, and in other embodiments, a membrane can include additional materials as known in the art, e.g., processing aids, strengthening agents, and the like. When included, such additives can generally be present in the separation membrane in a relatively small amount, e.g., a total about 5 wt. % or less of the weight of the separation membrane in additives.

A separation membrane can be utilized in separation systems as are known in the art to separate components of a gaseous mixture, and in one embodiment, to separate components of a gaseous mixture that have a kinetic diameter of about 500 picometers or less. Beneficially, the separation membranes can exhibit high ideal selectivity between gaseous compounds that differ in kinetic diameter from one another by as little as about 20 picometers. For instance, disclosed separation membranes can exhibit an ideal selectivity of about 5 or greater for gaseous compounds that differ in kinetic diameter by about 40 picometers, such as exhibiting an ideal selectivity of about 6 for gaseous compounds that differ in kinetic diameter by about 50 picometers.

In one embodiment, the separation membranes can be utilized to separate gases having a kinetic diameter of less than about 350 pm from gases having a kinetic diameter of greater than about 350 pm. For example, a separation membrane can separate one or more gases having a kinetic diameter of greater than about 350 picometers (e.g., nitrogen (364 pm), methane (380 pm), carbon monoxide (376 pm), ethylene (390 pm), hydrogen sulfide (360 pm), propane (430 pm)) from one or more gases having a kinetic diameter of less than about 350 picometers (e.g., hydrogen (289 pm), helium (260 pm), carbon dioxide (330 pm), ammonia (260 pm), oxygen (346 pm), nitrous oxide (330 pm)). However, it should be understood that in other embodiments, e.g., embodiments that vary with regard to polymer molecular weight, polymer chemistry, free polymer loading level, etc., other separation characteristics can be attained. For instance, a separation membrane can be utilized to separate different hydrocarbons from one another; for instance, to separate C1 to about C4 hydrocarbons from one another and/or to separate one or more hydrocarbons from other gaseous components such as carbon dioxide, hydrogen, etc. In one particular embodiment, disclosed separation membranes can be utilized in carbon capture technologies, for instance, to separate carbon dioxide from off gas of power plants or other industrial processes.

Figure 2:
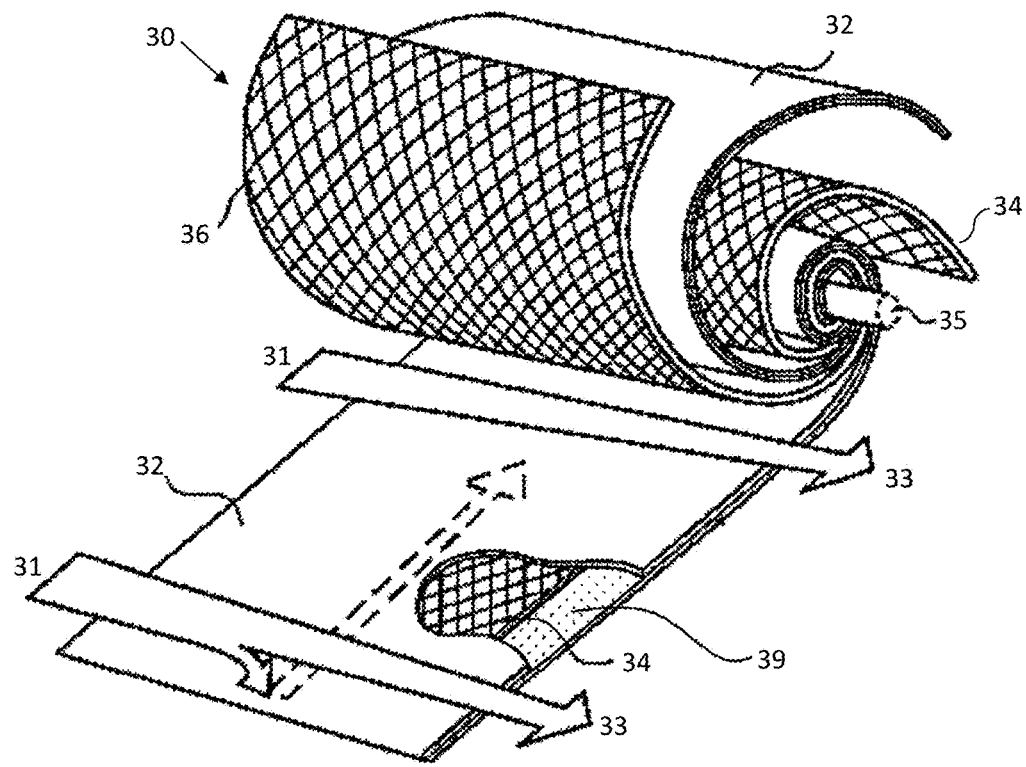
FIG. 2 presents a schematic illustrates of a spiral wound separation module as may incorporate a separation membrane as described herein.

In one embodiment, separation membranes as described can be a component of a gas separation module; for instance, a hollow fiber membrane module as schematically illustrated in FIG. 1 or a spiral wound membrane module as schematically illustrated in FIG. 2. As illustrated in FIG. 1, a hollow fiber membrane module 10 can include an outer housing or shell 12 and a plurality of hollow fiber membranes 14 encased within the shell 12. For instance, the plurality of hollow fiber membranes 14 can be attached or adhered to one another to form a removable cartridge that can be placed inside the shell 12. For instance, a hollow fiber membrane cartridge carrying multiple hollow fiber membranes 14 can be sealed within the shell 12 between a first end 16 and a second end 18. The ends of the hollow fiber membranes 14 are open to an upstream feed flow 20 and a downstream retentate flow 22. The permeate flow 24 is accessed from the volume of the shell 12 that is exterior to the hollow fiber membranes 14.

Of course, the particular arrangement of the various flows can be modified according to standard separation technologies as are known in the art. For instance, the feed flow can pass along the exterior surfaces of the hollow fiber membranes of a separation module, and the permeate can be collected from inside the hollow fiber membranes following permeation of the separated gases through the membranes.

As illustrated in FIG. 2, a spiral wound gas separation module 30 can typically include at least two separation membranes 32 and a permeate carrier 34 sandwiched between said membrane sheets. The permeate carrier 34 can be, for example, a smooth, gas permeable material that contacts the separation membranes 32 across all or most of their surfaces, such that the contact area of the membranes 32 with the permeate carrier 34 is very high (in many cases approaching 100%). Separation membranes 32 can be separated from each other by feed spacer screens 36, which can be of a relatively large mesh size to accommodate feed gas flow 31 from the upstream end of the module 30 and the retentate flow 33 out of the module. As illustrated, a stack of a permeate carrier 34, a first gas separation membrane 32, a feed spacers screen 36, and a second gas separation membrane 32 can be wound spirally onto a perforated permeate collection tube 35 which collects gas which has permeated into the gas separation membranes 32. In some embodiments, a module can also include an adhesive 39 that can adhere layers of the module to one another without impeding gas flow or separation through the membrane 32. For instance, the outside edges of the gas separation membranes 32 can be sealed to the permeate carrier 34 allowing access to the permeate carrier 34 only from a radial direction through the membrane 32.

The permeate carrier 34 can then be placed with an unsealed edge adjacent to a perforated permeate collection tube 35 and oriented along the length of the tube 35, allowing permeate to flow into the permeate collection tube 35 for downstream collection or processing. A spiral wound gas separation module can also include external restraining components, such as a hard shell, straps, anti-telescoping device or a bypass screen, or a combination thereof, which may be used to hold the various elements of the module in tight formation around the tube 35. The spiral module can then be loaded into a housing or pressure vessel as is known and operated at a slight pressure drop across the module as the gas being filtered flows through.

The present disclosure may be better understood with reference to the Examples set forth below.

Example

Materials

All solvents and materials were used as received. Methyl acrylate (99%, Acros®) and methyl methacrylate (99%, Acros®) were purified by filtration through an activated basic alumina column. Spherical silica nanoparticles (14±4 nm diameter [MEK-ST] and 53±17 nm diameter [MEK-ST-L]) were obtained from Nissan Chemical. 4 nm diameter $ZrO_2$ NPs were synthesized using the procedure by Garnweitner et al. (*Small* 3, 1626-1632. doi:10.1002/Smll.200700075 (2007)). Polymer free chains (matrices) were synthesized by the well-established Reversible Addition-Fragmentation Chain Transfer (RAFT) method. Deuterated PMMA chains (matrices) were purchased from Polymer Source and used as received. Grafted NPs were prepared using a Surface-Initiated Reversible Addition-Fragmentation Chain Transfer polymerization (SI-RAFT) synthesis. The RAFT agent 2-(dodecylthiocarbonothioylthio)propanoic acid (DoPAT) used for the polymerization was purchased from Boron Molecular, Inc.

SI-RAFT Synthesis

Silica nanoparticles (50.0 g, 30 wt. % in MEK solution) were added to a round bottom flask with 150 mL THF and 3.0 mL 3-aminopropyldimethylethoxy silane. After purging with $N_2$ for 30 minutes, the solution was refluxed at 75° C. for 5 hours. The solution was then cooled to room temperature and precipitated into large amount hexanes. The amine functional silica nanoparticles were recovered by centrifuge at 5000 rpm for 5 minutes. The dispersion-precipitation process was then repeated for another two times. The silica nanoparticles were then dispersed in 150 mL dry THF and added to 1.25 g activated DoPAT THF (3 mL) solution. The solution was stirred overnight and precipitated into a large amount of methanol and re-dispersed in THF. This dispersion-precipitation process was repeated until the supernatant solution was colorless. The nanoparticles were placed in a room temperature vacuum oven to dry. The grafted density of DoPAT-NP was about 0.47 chains/nm².

Polyaniline Monomer Synthesis: mono-2-(Methacryloyloxy)ethyl succinate (12.5 g, 54.3 mmol), n-phenyl-p-phenylenediamine (10 g, 54.3 mmol) were dissolved in 200 mL of dichloromethane (DCM) in 500 mL round bottom flask and put in an ice bath. Dicyclohexylcarbodiimide (DCC) (12.3 g, 59.8 mmol) dissolved in 50 mL DCM was added to mixture. The mixture was stirred in an ice bath for 30 minutes under nitrogen. (Dimethylamino)pyridine (DMAP) (0.66 g, 5.4 mmol) was dissolved in DCM and added slowly to the solution, which was stirred later at room temperature for 6 hours. The solution was filtered to remove the salt. After removing the solvent and performing silica gel column chromatography (1:1 mixture of hexane and ethyl acetate), a pink precipitate was obtained. The precipitate was then stirred in hot toluene for 30 minutes to recrystallize (15.5 g, 72% yield).

In a typical polymerization, DoPAT-NP (0.35 g, 0.43 chains/nm$^2$) was dispersed in 14 mL DMF and monomer, e.g., 7.37 mL methyl acrylate (0.081 mol). AIBN in DMF solution (0.356 mL, 0.01 M) was added to the solution, and finally the mixture was transferred into a dried Schlenk flask. The mixture was degassed by three freeze-pump-thaw cycles, backfilled with nitrogen, and then placed in an oil bath at 60° C. The polymerization solution was quenched in ice water after 2.25 hours. THF (20 mL) was added to the flask and the solution was poured into hexanes (120 mL) to precipitate GNP, e.g., PMA-grafted nanoparticles. The GNP were recovered by centrifuge at 3000 rpm for 10 minutes. The GNP, e.g., PMA-g-SiO$_2$, was dispersed in 50 mL THF and precipitated in 100 mL methanol. This dispersion-precipitation process was repeated for another five times. For analysis, the polymer chains were cleaved by treating 50 mg nanoparticles in 3 mL THF with 0.2 mL HF (51% aqueous solution), and the resulting polymer chains were analyzed by GPC.

Polymer molecular weights and dispersities were determined using gel permeation chromatography calibrated to standards obtained from Polymer Laboratories. The chemical composition of the chains was determined with $^1$H NMR and $^{13}$C NMR (Bruker Avance 300) using CDCl$_3$ as solvent. Average molecular weights ($M_n$) and dispersities (Đ) of the polymer chains and GNPs are listed in Table 1, below.

TABLE 1

| $M_n$ (kDa) | Đ (m$^2$/s) |
|---|---|
| 29 | 1.18 |
| 61 | 1.17 |
| 80 | 1.16 |
| 88 | 1.16 |
| 100 | 1.22 |
| 136 | 1.22 |

Film Formation

Films were fabricated via a solution casting method. Concentrated solutions in THF were cast on to aluminum supports for use in the experiments. Most films were formed with a thickness that would minimize multiple scattering from the films. THF was allowed to evaporate at ambient conditions for 2 days before annealing at 80° C. in a high-vacuum oven for 3 days. All the materials used for the experiments were treated the same way prior to the experiments to minimize variations due to processing.

GNP/ungrafted polymer composites were created by blending pure GNPs with molecular weight of the grafter polymers $M_{graft} \approx 100$ kDa at $\sigma \approx 0.5$ chains/nm$^2$ and free PMA chains of varying molecular weight ($M_{free}$) and loading ($\omega_{free}$, wt. % free polymer) in solution, followed by solvent drying and annealing.

Steady-state gas permeabilities were measured on solution-cast films with thicknesses 80-120 μm using the constant-volume/variable pressure technique. Films were supported with filter paper and mounted onto brass discs of known inner diameter. Gas permeabilities were measured in the following order: H$_2$, He, O$_2$, N$_2$, CH$_4$, CO$_2$. Diffusion constants and solubilities of CO$_2$ and CH$_4$ were also measured with QCM-D (Biolin Scientific, Sweden) transient mass uptake experiments on spin-cast films <5 μm in thickness. AT-cut quartz crystal sensors were cleaned with a 5:1:1 mixture of deionized water, ammonium hydroxide, and hydrogen peroxide, then UV-ozone treated before taring the sensor for use as a microbalance. Films were spin-cast from concentrated (>60 mg/mL) solutions. Gas permeabilities measured with the two techniques agreed within experimental error. PALS experiments were conducted at the pulsed low energy positron system (PLEPS) at the Heinz Maier-Leibnitz Zentrum (Germany) on bulk samples with implantation energy of 16 keV. The data were analyzed with the PALSFIT3 program.

Structural Characterization

SANS was performed on the PA20 spectrometer of the LLB (Saclay, France) at fixed incident wavelength $\lambda = 0.6$ nm for 3 sample to detector distances: 1.5, 8, and 19 m. The scattering curves were normalized for sample thickness, transmission, and normal water scattering to correct for detector heterogeneities. The empty beam and electronic background contributions were subtracted, and absolute units were determined as a function of the incident neutron beam intensity. Data reduction was done using the home-made PASINET software, and modelling and fitting were performed with SASfit.

SAXS experiments on PMA composites were performed on bulk samples of GNP composites using a lab-scale instrument (SAXSlab, Amherst, MA) with a beam cross-section 100×100 μm and wavelength $\lambda = 0.154$ nm (incident energy of 12.4 KeV) for 4 sample-to-detector distances of 1.5, 1, 0.5, and 0.05 m, respectively. Samples were ≈1 mm in thickness. The data were background subtracted and reported as scattered intensity as a function of momentum transfer, q. The SAXS/USAXS measurements on PMMA composites were done by synchrotron SAXS using the ID02 high-brilliance beamline (ESRF, Grenoble, France), with a beam cross-section 200×400 μm and wavelength $\lambda = 0.1$ nm (incident energy of 12.4 KeV) for 2 sample-to-detector distances of 1 and 30 m, respectively. SAXS data were recorded on a Rayonix® MX-170HS and USAXS on a FReLoN 16M Kodak® CCD. The data were treated for angular regrouping and background subtraction, and then reported as intensity as a function of q.

TEM samples were made by drop casting solutions of 1-1.25 mg/mL in 95/5 THF/Chloroform on to Lacey Carbon TEM grids (Electron Microscopy Services, Hatfield, PA) and imaged using a Phillips CM12 TEM.

Results

Transmission electron microscopy (TEM) and SAXS showed that the GNPs were miscible with all free chains with $M_{free} \leq 210$ kg/mol, and the NP spacing increased monotonically with $\omega_{free}$.

Figure 3:
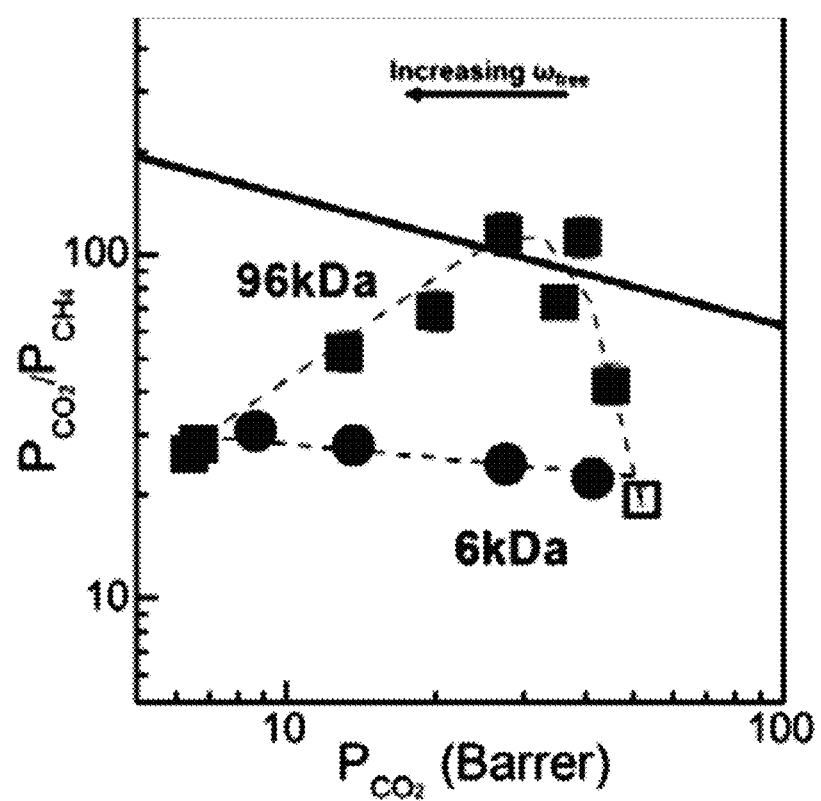
FIG. 3 presents a Robeson plot of membranes formed of poly(methacrylate) (PMA)-grafted nanoparticles (100 kDa) with either 6 kDa (circles) or 96 kDa (squares) free PMA chains. The loading of free chains increases going to the left.
Figure 4:
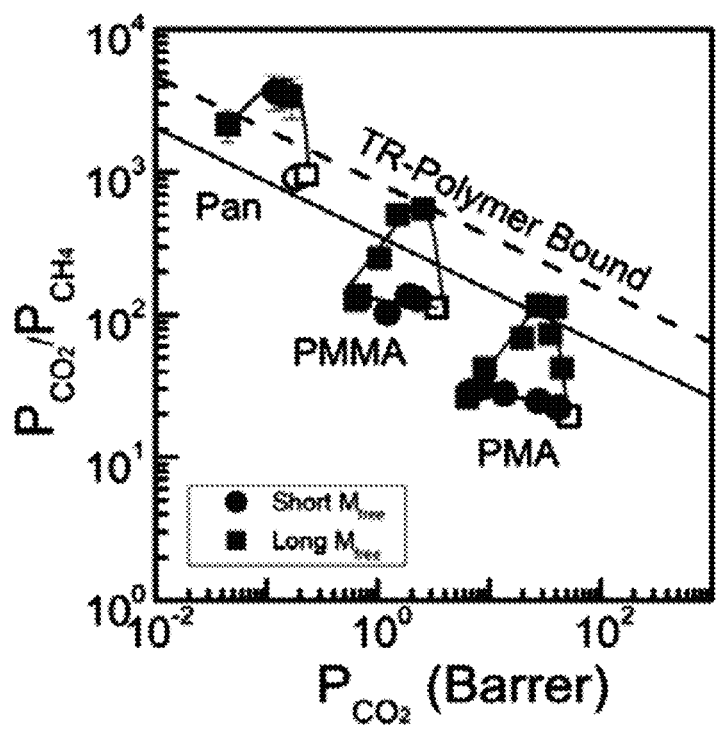
FIG. 4 presents a Robeson plot of PMA-grafted and poly(methyl methacrylate) (PMMA)-grafted GNP membranes at similar conditions (100 kDa graft polymer with 3 kDa "short" free chains (circles), or 90 kDa "long" chains (squares) and PAn-based composites (30 kDa graft polymer and 30 kDa free chains). The solid black line is the 2008 Robeson Upper Bound.

For $M_{free} = 6$ kDa, increasing $\omega_{free}$ resulted in monotonically decreasing $P_{CO_2}$ and slightly increased CO$_2$/CH$_4$ selectivity (FIG. 3 and FIG. 4). For $\omega_{free} > 10$ wt. %, the performance of the composite was comparable that of pure PMA (i.e., without NPs). In contrast, for $M_{free} = 96$ kDa unexpected, non-monotonic permeability vs selectivity behavior with increasing $\omega_{free}$ was demonstrated. FIG. 3 shows large (≈6×) increases in $CO_2/CH_4$ selectivity for $\omega_{free}$=2 wt. %. At the peak selectivity in FIG. 3, $P_{CO_2}$ decreased only by about a factor of two relative to the pure GNPs but $P_{CH_4}$ decreases by more than an order of magnitude. For $\omega_{free}$>2 wt. % both $P_{CO_2}$ and $\alpha_{CO_2/CH_4}$ decreased and approached values of pure PMA. As shown, the PMMA composite membranes were competitive with the Thermally Rearranged (TR) polymers, while the PAn-based materials exceeded this bound.

Figure 5:
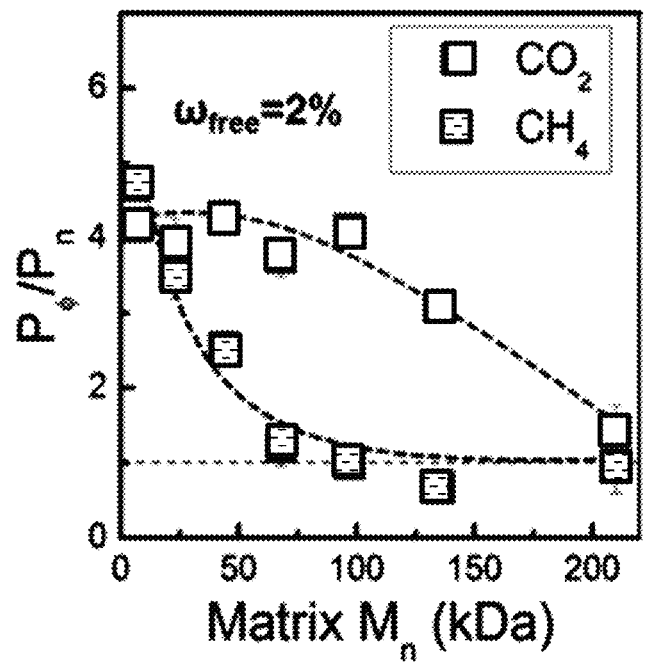
FIG. 5 presents a graph showing change in selectivity between $CO_2$ and $CH_4$ with variation in molecular weight of the free polymer of the composite and shows the permeability enhancement relative to neat PMA vs. added free chain molecular weight at constant free polymer addition ($\omega_{free}$)=2 wt. %.
Figure 6:
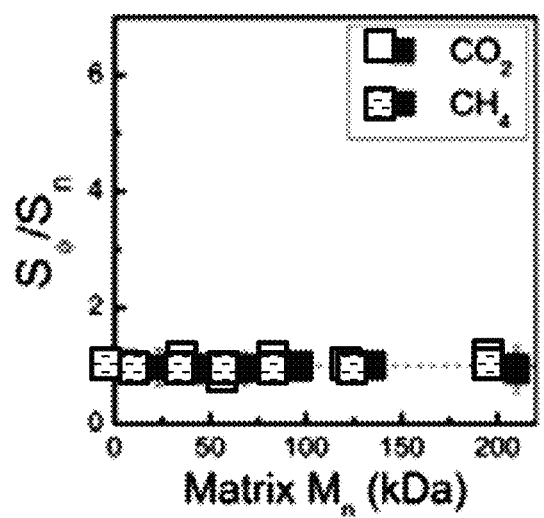
FIG. 6 illustrates changes in solubility constant as a function of $M_{free}$ for the materials of FIG. 5
Figure 7:
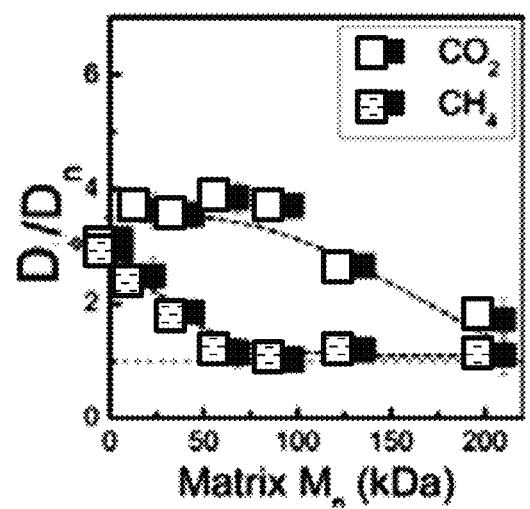
FIG. 7 illustrates changes in diffusivity as a function of $M_{free}$ for the materials of FIG. 5.

FIG. 5 shows that the selectivity maximum increased monotonically with increasing $M_{free}$ between 6 kDa and 96 kDa. Beyond $M_{free}$=96 kDa, however, the maximum in selectivity decreased and composites with $M_{free}$=210 kDa displayed permeability and selectivity equal to the neat homopolymer. Composites with $M_{free}$=96 kDa free chains thus yielded the best separation performance. As shown, the $CO_2$ permeability was practically unaffected by $M_{free}$<100 kDa, while $CH_4$ permeability consistently decreased over the range, leading to selectivity enhancements. These permeability variations were dominated by changes in diffusivity (FIG. 6, FIG. 7), implicating "free-volume" effects.

Experiments on analogous PMMA-grafted NPs in a PMMA matrix with similar σ, $M_{graft}$ and $M_{free}$ showed comparable trends (FIG. 4). Polyaniline (PAn)-based GNPs in a PAn matrix with $M_{graft}$=$M_{free}$≈30 kDa, σ≈0.25 chains/nm² also behaved similarly (FIG. 4). As demonstrated, the PMMA-based mixtures were competitive with the best TR polymers while the PAn-based materials exceed this metric.

Figure 8:
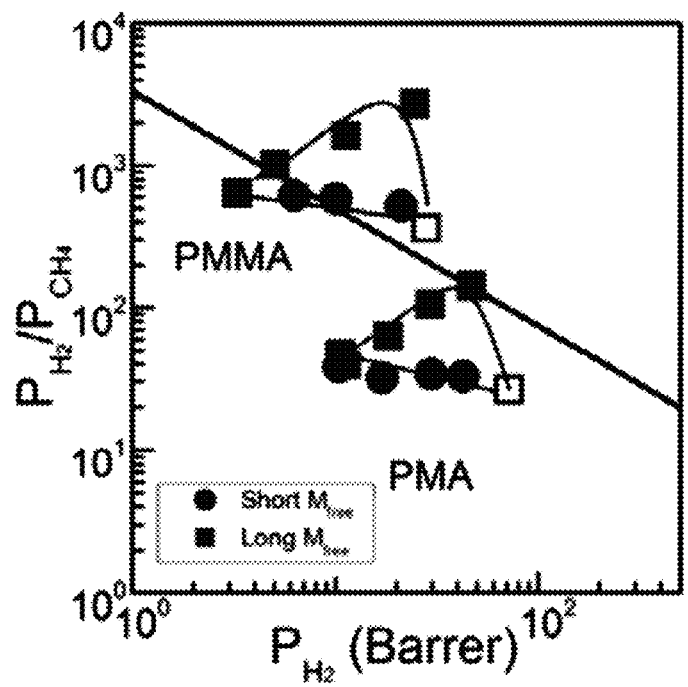
FIG. 8 presents a Robeson plot for $H_2/CH_4$ separations using PMMA GNP membranes as described.

The $CO_2/CH_4$ selectivity enhancement observed by adding homopolymer was also found for other gas pairs, with its degree correlating directly with the $d_{gas}$ values. While pairs with similar $d_{gas}$ (e.g., $He/H_2$) fell well below the Upper Bound and performed similarly to the ungrafted polymer, other pairs with disparate $d_{gas}$ (e.g., $H_2/CH_4$, FIG. 8) well exceeded their Upper Bounds. Data for two other PMA-grafted NPs, $M_{graft}$=30 kDa and 130 kDa, also showed that the maximum selectivity change occurred when $M_{free}$≈$M_{graft}$ (FIG. 8)

Figure 9:
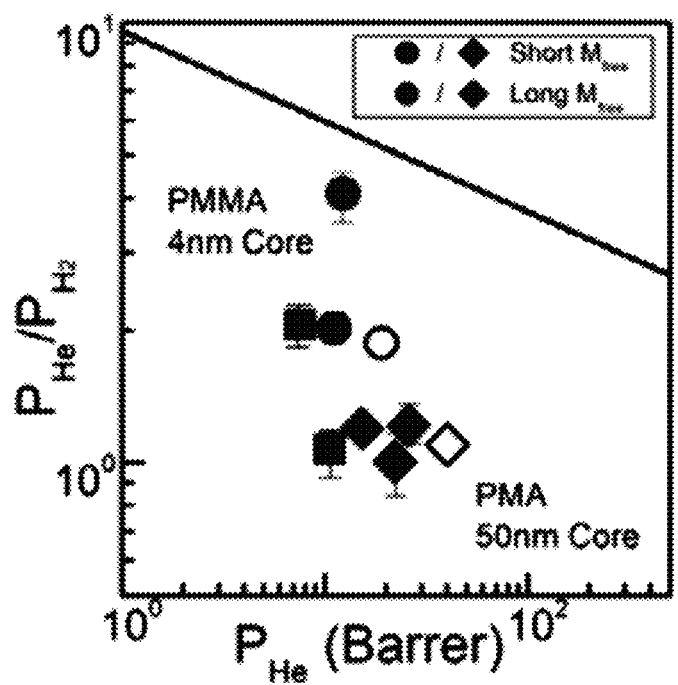
FIG. 9 illustrates the effect of changing the nanoparticle core size on $He/H_2$ selectivity. Large nanoparticles consistently showed no change in selectivity regardless of gas pair, while small nanoparticles were able to be designed to selectively separate He and $H_2$. Filled black symbols are the pure polymers, the open symbols the corresponding pure GNPs and filled symbols the corresponding mixtures. Circles—4 nm cores, diamonds—50 nm cores.

Selectivity enhancement could be further tuned by varying the nanoparticle core size. For example, composites with 50 nm silica cores showed no changes in selectivity for any gas pair that was studied ($d_{gas}$≤5 Å, FIG. 9) regardless of $M_{free}$ or $\omega_{free}$. Conversely, while GNPs with a 4 nm diameter core also showed no changes in $CO_2/CH_4$ selectivity, they instead significantly affected the permeability of even smaller gas mixtures such as $He/H_2$ (FIG. 9). GNP membrane constructs as described thus have the potential to be applied to many different gas pairs.

Figure 10:
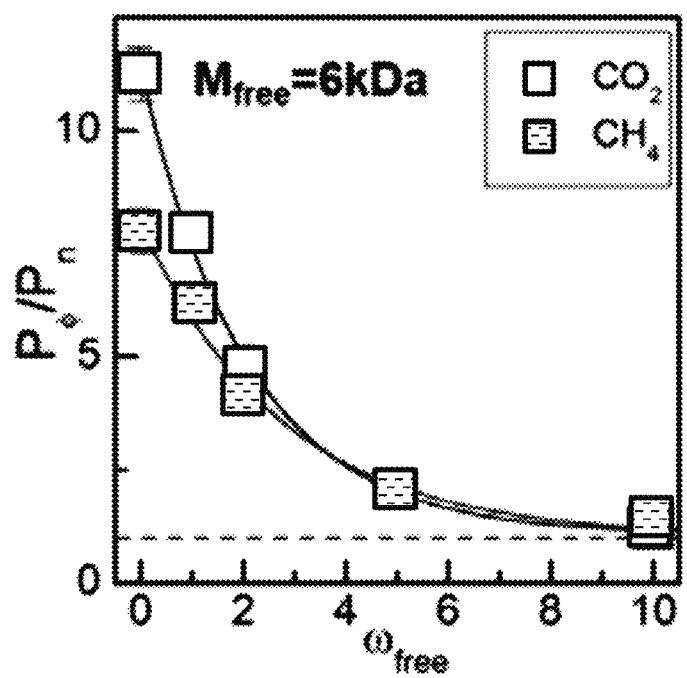
FIG. 10 illustrates size-dependent transport of gases in GNP/free PMA mixtures and shows permeability enhancement in PMA-grafted NP (100 kDa) composites with added 6 kDa free chains.
Figure 11:
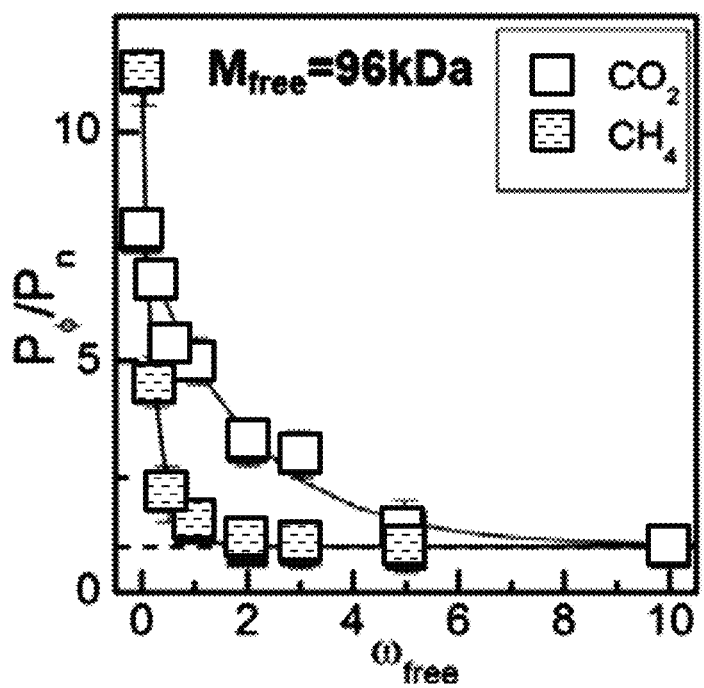
FIG. 11 illustrates size-dependent transport of gases in GNP/free PMA mixtures and shows permeability enhancement in PMA-grafted NP (100 kDa) composites with added 96 kDa free chains at various $\omega_{free}$.

To understand the role of $d_{gas}$, $P_{CO_2}$ and $P_{CH_4}$ were separately examined in the PMA-based GNPs shown in FIG. 3 (14 nm diameter with $M_{graft}$=100 kDa, σ≈0.5 chains/nm²) relative to that in pure PMA as a function of $\omega_{free}$ (FIG. 10, FIG. 11; the y-axis was normalized relative to the permeability of the corresponding gas). The change in how $CH_4$ responded to added free chains of different molecular weight is clearly visible, while $CO_2$ permeability enhancements behaved similarly in both matrices. On adding increasing amounts of $M_{free}$=6 kDa (FIG. 10), the permeabilities of both gases decreased, with $CH_4$ decreasing slightly faster. For the $M_{free}$=96 k Da composites (FIG. 11), the $\omega_{free}$ dependence of $CO_2$ permeability was qualitatively similar to that for short $M_{free}$. However, the $CH_4$ permeability dropped to its neat polymer value much more quickly. Each of these curves was fit to $$\frac{P_\phi}{P_n} = 1 + \beta_{\phi,0} e^{-\omega_{free}/\omega^*}.$$

Figure 12:
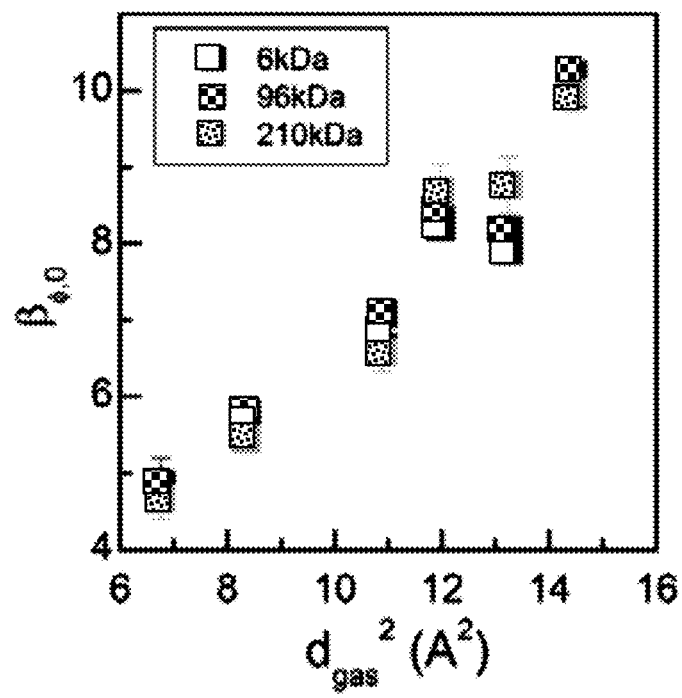
FIG. 12 presents a two-parameter exponential fit for the permeability enhancement of the pure GNPs ($\beta_{\phi,0}$) relative to the pure PMA obtained from fitting the data in FIGS. 10 and 11 plotted as a function of the kinetic diameter squared ($d_{gas}^2$).
Figure 13:
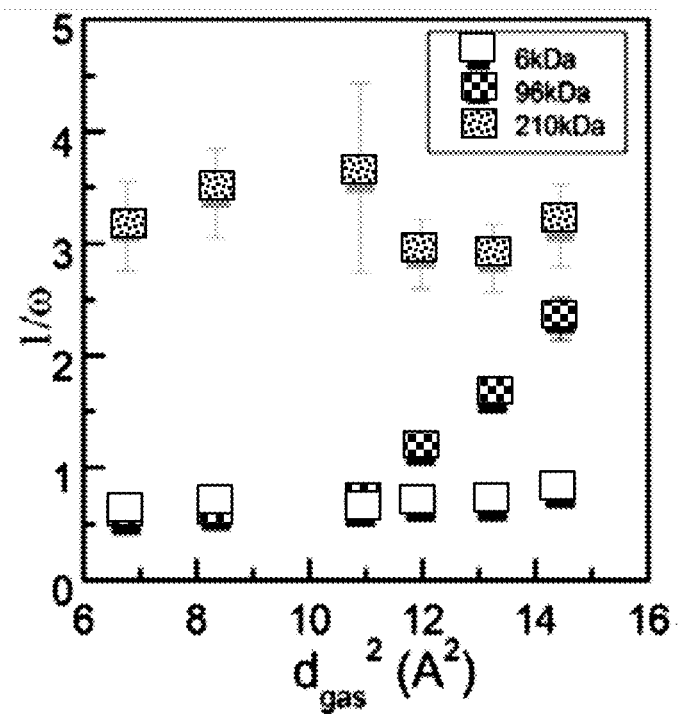
FIG. 13 presents a two-parameter exponential fit for the sensitivity of gas diffusivity to added free chains at a given molecular weight ($1/\omega^*$) (in units of inverse wt. % added free polymer) relative to the pure PMA obtained from fitting the data in FIGS. 10 and 11 plotted as a function of $d_{gas}^2$.

This model was reasonable since the fit values of $\beta_{\phi,0}$ were found to be equal to the permeability enhancement of the pure GNPs and were independent of $M_{free}$ (FIG. 12). $1/\omega^*$ is the sensitivity of permeability enhancement to added homopolymer (FIG. 13). For $M_{free}$=6 kDa, $1/\omega^*$ is small and only weakly depends on $d_{gas}$. The free chains reduced the permeability of differently sized gases in a similar manner with variations in $\omega_{free}$. The $M_{free}$=96 kDa data, in contrast, show that gases with $d_{gas}$<3.5 Å have $1/\omega^*$ comparable to the $M_{free}$=6 kDa composites, while larger gas molecules have much larger $1/\omega^*$. Apparently, only the diffusion of large gases was selectively hindered by the addition of higher $M_{free}$ polymer. For $M_{free}$=210 kDa, $1/\omega^*$ was large and independent of $d_{gas}$; these chains reduced permeability for all gases and this effect is 6 times larger than for $M_{free}$=6 kDa.

Figure 14:
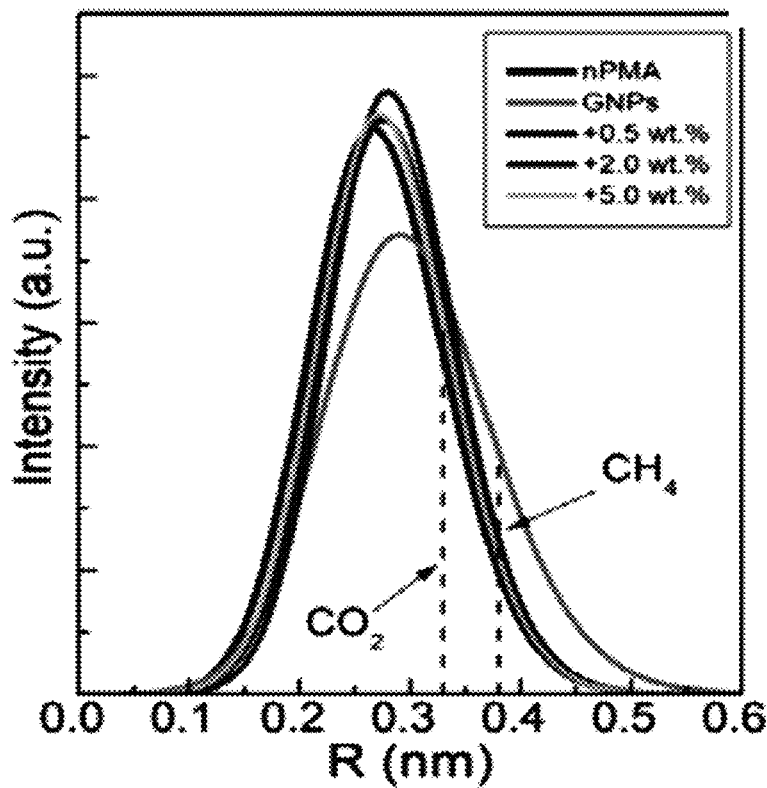
FIG. 14 presents the distribution of free volume radii in PMA-grafted GNP composites. The $d_{gas}$ of $CO_2$ and $CH_4$ are shown for reference.
Figure 15:
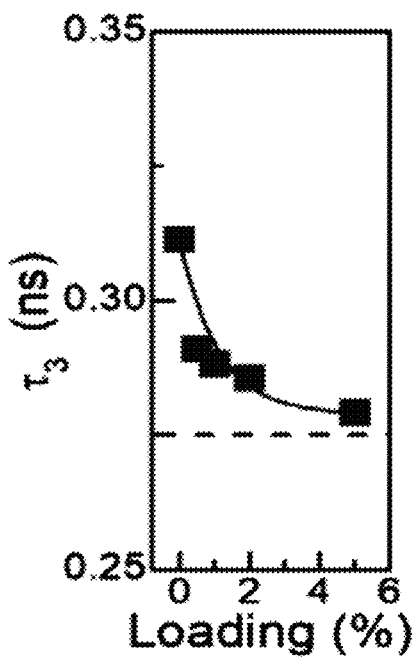
FIG. 15 illustrates the moments of ortho-positronium (o-Ps) lifetime distributions in the composites and shows that the average lifetime ($\tau_3$, related to average free volume radius) decreases with free chains.
Figure 16:
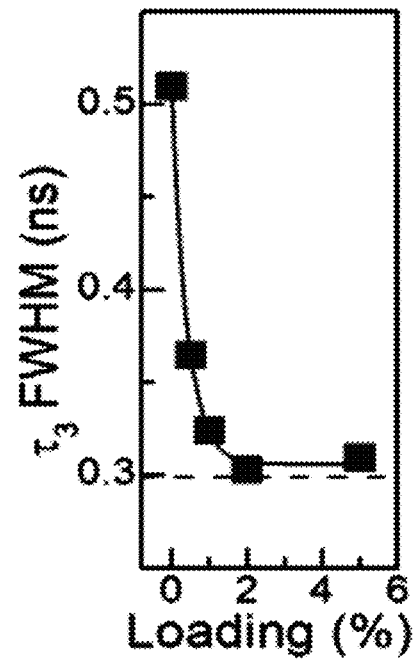
FIG. 16 illustrates the moments of o-Ps lifetime distributions in the composites and shows that the full-width/half-maximum (FWHM, related to the distribution of radii) rapidly decreased to that of the pure polymer.

PALS was employed to determine ortho-positronium (o-Ps) lifetimes, which were then translated into free volume distributions (FIG. 14, FIG. 15, FIG. 16). The pure GNPs had distributions broadened significantly towards longer o-PS lifetimes relative to the neat polymer. This readily corroborated the enhanced permeability and lowered selectivity for the GNPs relative to the pure polymer. Adding increasing amounts of $M_{free}$=96 kDa homopolymer reduced the high end of the free volume distribution, leading to a substantial decrease in the permeability of the larger $CH_4$. The mean o-Ps lifetime only returned to its pure polymer value for $\omega_{free}$≥5%, apparently tracking the behavior of the permeability of the smaller $CO_2$. It was thus clear that the addition of the 96 kDa homopolymer strongly altered free-volume distributions and as a result, gas transport behavior; however, it was also apparent that the different gases were more sensitive to the mean vs. the width of the o-PS lifetime distribution.

Figure 17:
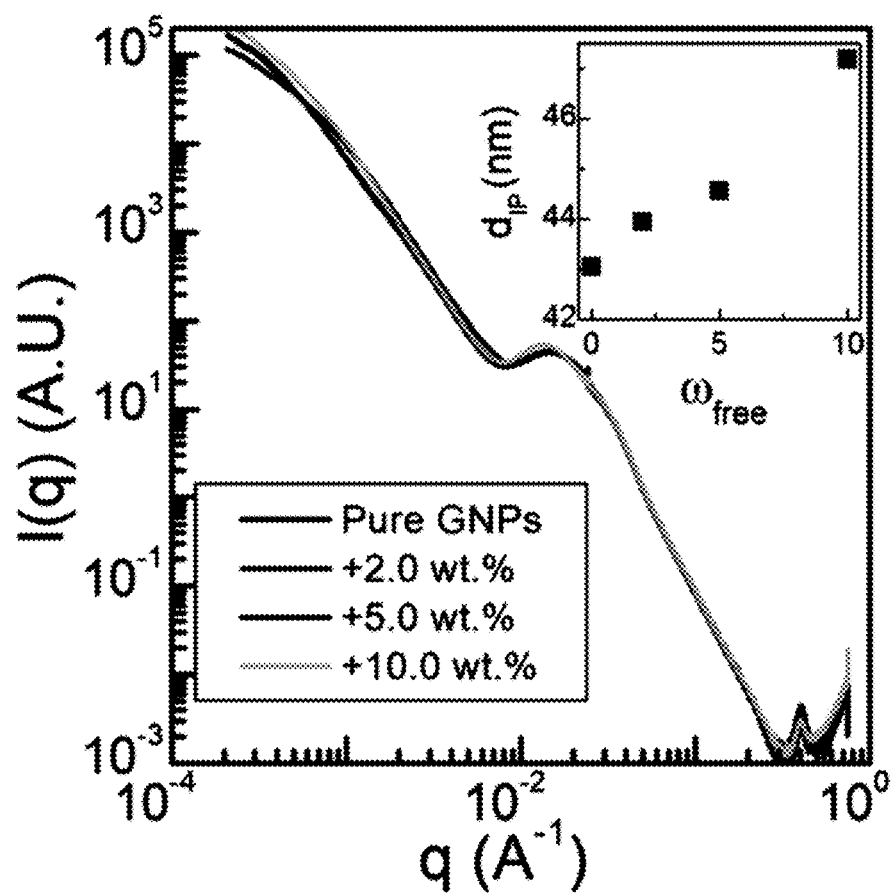
FIG. 17 presents ultra-small angle x-ray scattering (USAXS) of PMMA-grafted GNPs (97 kDa) with added deuterated PMMA free chains with molecular weights of 3 kDa.
Figure 18:
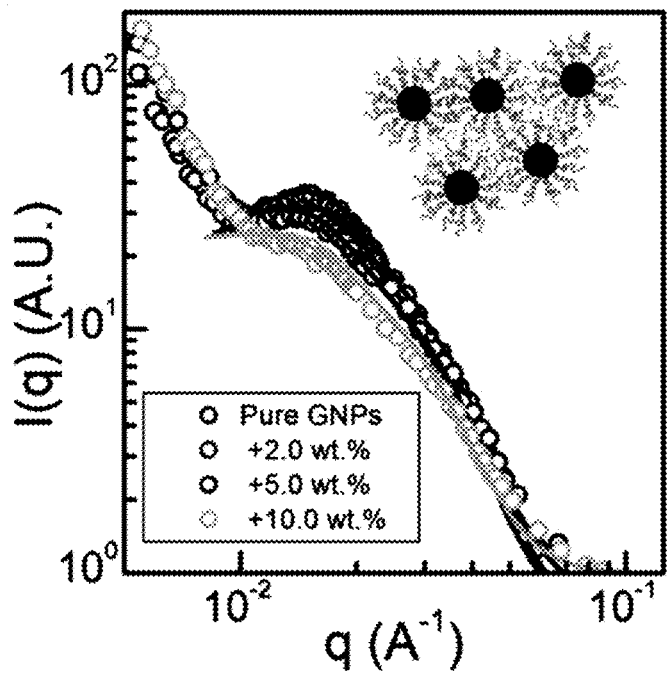
FIG. 18 presents small angle neutron scattering (SANS) data of PMMA-grafted GNPs (97 kDa) with added deuterated PMMA free chains with molecular weights of 3 kDa and shows only one peak with decreasing intensity (i.e. the free chains are isotropically distributed, Inset.
Figure 19:
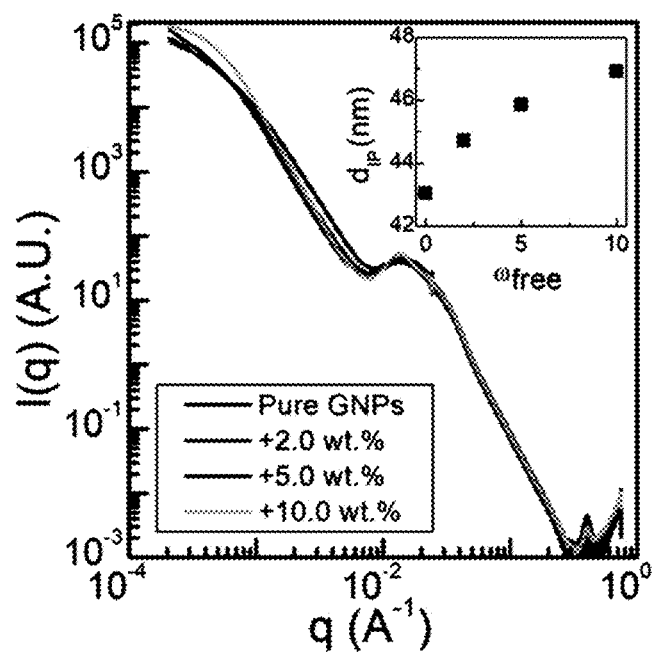
FIG. 19 presents USAXS data of PMMA-grafted GNPs (97 kDa) with added deuterated PMMA free chains with molecular weights of 90 kDa.

SAXS and Small Angle Neutron Scattering (SANS) of PMMA-grafted GNP composites with added deuterated PMMA (dPMMA) chains were used to elucidate the structural origins of these changes (FIG. 17, FIG. 18, FIG. 19, FIG. 20). It was found that short ($M_{free}$=3 kDa) chains were present homogeneously in the GNP brush (FIG. 17, FIG. 18). The single, broad SAXS peak, which is only sensitive to the x-ray contrast between the silica and the polymer, is adequately described by the Percus-Yevick hard-sphere model. The intensity increase in the low-q region was attributed to micron-scaled inhomogeneities that do not influence the local, NP-level organization (which is the length-scale relevant to gas transport). SANS can distinguish among the silica core, the protonated graft chains (hPMMA) and the deuterated free chains. Only a single peak in the SANS was found (again corresponding to the inter-NP spacing) but with an intensity that decreased with added polymer. This was due to a reduction in contrast between the silica and an essentially homogenous mixture of the dPMMA free chains and the hPMMA grafts.

Figure 20:
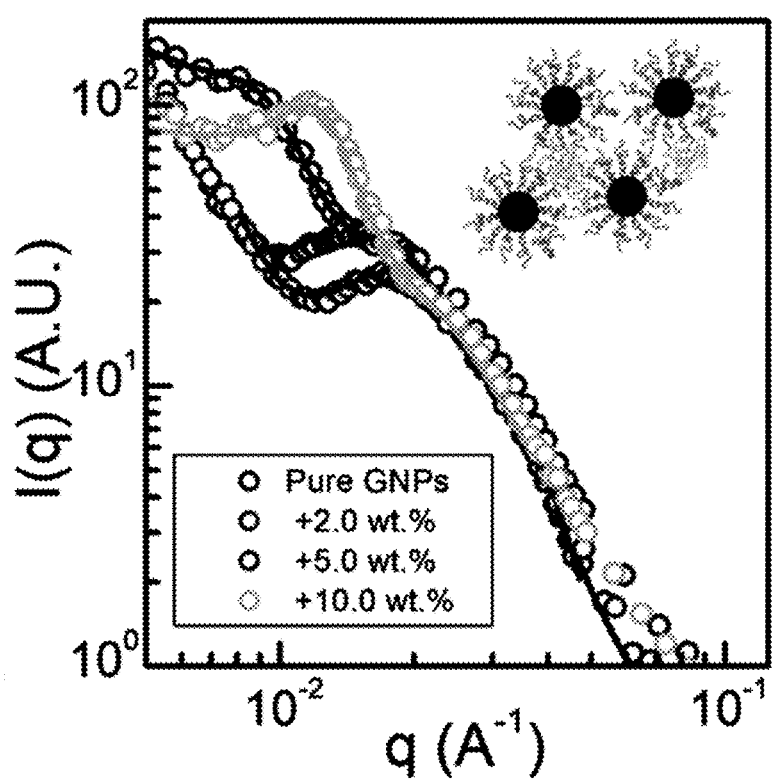
FIG. 20 presents SANS data of PMMA-grafted GNPs (97 kDa) with added deuterated PMMA free chains with molecular weights of 90 kDa. The lower-q features in FIG. 20 are a result of the 90 kDa dPMMA free chains localizing near the interstitial spaces between the NPs (Inset).

The situation was different for the $M_{free}$=90 kDa composites. While the SAXS results were consistent with the $M_{free}$=3 kDa sample (FIG. 19), there was a new secondary low-q SANS scattering feature in the $\omega_{free}$=5 wt. % and 10 wt. % samples evidently corresponding to free dPMMA chains spaced at distances larger than the mean inter-NP spacing (FIG. 20). These curves were fit with an empirical model where the contributions from two different form and structure factors were summed. The high-q peak was modeled with a core-shell form factor (silica core+grafted brush), and the low-q peak with a second core-shell structure comprised of a dPMMA core of size ~5 nm surrounded by a shell which is a mixture of hPMMA from the brush and dPMMA from the free chains. The two structure factors (each described by the Percus-Yevick hard sphere model) describe the interactions between the NP grafted cores and between the dPMMA enriched domains, respectively. The spacing between the dPMMA cores was about 1.3 times larger than the inter-NP spacing at $\omega_{free}$=5 wt. % (FIG. 18, FIG. 20, insets) but appeared to converge onto the inter-NP spacing at $\omega_{free}$=10 wt. %. It was also noted that the low-q peak narrows as the $\omega_{free}$ is increased. These results support the theory that large free chains are not isotropically distributed in the polymer brush, but are instead localized in the interstices, even though they are miscible with the GNPs. Not all interstices are occupied at low $\omega_{free}$, however, giving rise to the broad low-q scattering shoulder at $\omega_{free}$=5 wt. % (FIG. 4D). The shift of this feature to higher q and its sharpening suggest that more of the interstices become filled at higher $W_{free}$.

While certain embodiments of the disclosed subject matter have been described using specific terms, such description is for illustrative purposes only, and it is to be understood that changes and variations may be made without departing from the spirit or scope of the subject matter.

What is claimed is:

1. A gas separation membrane comprising:
   polymer grafted nanoparticles, the polymer grafted nanoparticles including a core particle and a polymer grafted to a surface of the core particle, the polymer grafted to the surface of the core particle having a first number average molecular weight; and
   free polymer, the free polymer and the polymer grafted to the surface of the core particle having the same chemical structure, the free polymer having a second number average molecular weight, the second number average molecular weight differing from the first number average molecular weight by about 20% or less of the first number average molecular weight, the gas separation membrane comprising the free polymer in an amount that is about 10 wt. % or less by weight of the polymer grafted nanoparticles.

2. The gas separation membrane of claim 1, the gas separation membrane comprising the polymer grafted nanoparticles in an amount of about 85 wt. % or more by weight of the gas separation membrane.

3. The gas separation membrane of claim 1, wherein the grafted polymer has a polydispersity index of about 2 or less or wherein the free polymer has a polydispersity index of about 2 or less.

4. The gas separation membrane of claim 1, wherein the first number average molecular weight is from about 50 kDa to about 150 kDa and wherein the second number average molecular weight is are from about 50 kDa to about 150 kDa.

5. The gas separation membrane of claim 1, wherein the chemical structure comprises polyacrylates, poly (methacrylates), poly (alkyl methacrylates), poly (acrylamides), polystyrenes, polyanilines, polyimides, polyesters, polyamides, or copolymers thereof.

6. The gas separation membrane of claim 1, wherein the gas separation membrane has a thickness of from about 0.05 micrometers to about 500 micrometers.

7. A gas separation module comprising the gas separation membrane of claim 1.

8. The gas separation module of claim 7, wherein the gas separation module comprises a hollow fiber membrane module or a spiral wound membrane module.

9. The gas separation module of claim 7, wherein the gas separation membrane is supported on a porous substrate.

10. A method for forming a gas separation membrane comprising:
    grafting a polymer to a surface of a core particle to form a polymer grafted nanoparticle, the polymer grafted to the core particle having a first number average molecular weight;
    combining a plurality of the polymer grafted nanoparticles with free polymer to form a mixture, the free polymer and the polymer grafted to the surface of the core particle having the same chemical structure, the free polymer having a second number average molecular weight, the second number average molecular weight differing from the first number average molecular weight by about 20% or less of the first number average molecular weight, the mixture comprising the free polymer in an amount of about 10% or less by weight of the polymer grafted nanoparticles; and
    processing the mixture to form the gas separation membrane.

11. The method of claim 10, wherein the mixture is solution cast or melt processed to form the gas separation membrane.

12. The method of claim 10, wherein the polymer is grafted to the surface of the core particle according to a "grafted from" polymerization technique.

13. The method of claim 10, wherein the polymer is grafted to the surface of the core particle according to a Reversible Addition-Fragmentation Chain Transfer technique, an Atom Transfer Radical Polymerization technique, a Nitroxide-mediated polymerization technique, or a ring opening polymerization technique.

14. The method of claim 10, wherein the step of processing the mixture comprises forming the gas separation membrane on a porous supporting substrate or applying the gas separation membrane to a porous supporting substrate.

15. A method for separating a mixture of gases, the method comprising contacting a gas separation membrane with the mixture of gases, the gas separation membrane comprising polymer grafted nanoparticles, the polymer grafted nanoparticles including a core particle and a polymer grafted to a surface of the core particle, the polymer grafted to the surface of the core particle having a first number average molecular weight, the gas separation membrane further comprising free polymer, the free polymer and the polymer grafted to the surface of the core particle having the same chemical structure, the free polymer having a second number average molecular weight, the second number average molecular weight differing from the first number average molecular weight by about 20% or less of the first number average molecular weight, the gas separation membrane comprising the free polymer in an amount that is about 10 wt. % or less by weight of the polymer grafted nanoparticles, wherein upon the contact, a first gaseous component of the mixture preferentially permeates the membrane as compared to a second gaseous component of the membrane, the membrane exhibiting an ideal selectivity for the permeation of the first gaseous component of about 2 or greater.

16. The method of claim 15, wherein the membrane exhibits an ideal selectivity of about 5 or greater for the permeation of the first component.

17. The method of claim 15, wherein the first gaseous component has a first kinetic diameter and the second gaseous component has a second kinetic diameter, the first kinetic diameter being greater than about 350 picometers and the second kinetic diameter being less than about 350 picometers or wherein the difference between the first kinetic diameter and the second kinetic diameter is about 50 picometers or less.

18. The method of claim 15, wherein the first component comprises a hydrocarbon or wherein the second component comprises carbon dioxide.

\* \* \* \* \*